United States Patent [19]

Blasbalg

[11] 4,032,719
[45] June 28, 1977

[54] MODULAR SLOT INTERCHANGE DIGITAL EXCHANGE

[75] Inventor: Herman Blasbalg, Raleigh, N.C.

[73] Assignee: International Business Machines Corporation, Armonk, N.Y.

[22] Filed: June 26, 1975

[21] Appl. No.: 590,547

[52] U.S. Cl. .................. 179/15 AS; 179/15 AQ
[51] Int. Cl.² ................ H04J 6/02; H04Q 11/04
[58] Field of Search ..... 179/15 AS, 15 AQ, 15 AT, 179/18 GF, 18 FC, 18 ES, 15 AL, 15 A, 15 BW; 340/172.5

[56] References Cited

UNITED STATES PATENTS

| | | | |
|---|---|---|---|
| 3,644,679 | 2/1972 | Tallegas | 179/15 AQ |
| 3,644,680 | 2/1972 | Amano | 179/15 AS |
| 3,678,205 | 7/1972 | Cohen | 179/15 AQ |
| 3,715,505 | 2/1973 | Gordon | 179/15 AQ |
| 3,749,845 | 7/1973 | Fraser | 179/15 AL |
| 3,761,894 | 9/1973 | Pilc | 179/15 AQ |
| 3,851,124 | 11/1974 | Garaualia | 179/18 GF |
| 3,927,268 | 12/1975 | Sciulli | 179/15 BW |
| 3,956,593 | 5/1976 | Collins | 179/15 AT |

Primary Examiner—David L. Stewart
Attorney, Agent, or Firm—Robert Lieber

[57] ABSTRACT

Up to $k$ (e.g. 4) slot interchange memory/switch modules operate under common control to provide varied time interchange connective pairing associations between space divided telephone and data lines and time divided channels of digital trunks. A high scanning rate combined with dot-OR'ed (commoned) busing of addresses and outputs of all interchange modules permits in-service expansion of interchange switching capacity, from the capacity of 1 module to that of $k$ modules, with minimal re-work of existing circuits and common control programs. The interchange slot locations of the aggregate array are thereby linkable in paired randomly ordered time interchange associations, over the entire addressing range of the aggregate. Additional interchange spaces are available in each switch module for interchanging activity bits in association with information traffic. These bits are useful for companding control, echo cancellation, TASI and network routing. Activity bits associated with input loads to individual trunks are processed to form a TASI mask for out-of-band transmission over a channel of the respective trunk. Trunk channels are allotted to the traffic in accordance with respective bits of the mask. If the input load exceeds the capacity of a frame the mask is structured to effectively freeze out (and cancel) part of the traffic load. Traffic to be cancelled is selected in a predetermined order of priority favoring data over voice (talkspurt) activity and continuing talkspurt activity over initial talkspurt activity. The selection is complicated due to the short time available between the sensing of potential overload and the transmission of the TASI mask. Freezeout rates exceeding a predefined threshold are monitored and reported through the interruption facility of the common controls as an information parameter useful for high level network management. A network management system linked to a network of such exchanges may thereby reconfigure "route" tables governing slot interchange assignments to balance trunk loads throughout the network. The slot interchange timing cycle and addressing capability are designed to permit establishment of line-to-line "local" interchange connection associations as well as line-to-trunk "toll" associations. Trunk traffic is aggregated in large bit blocks per channel for communication efficiency (high ratio of traffic to link control information).

15 Claims, 15 Drawing Figures

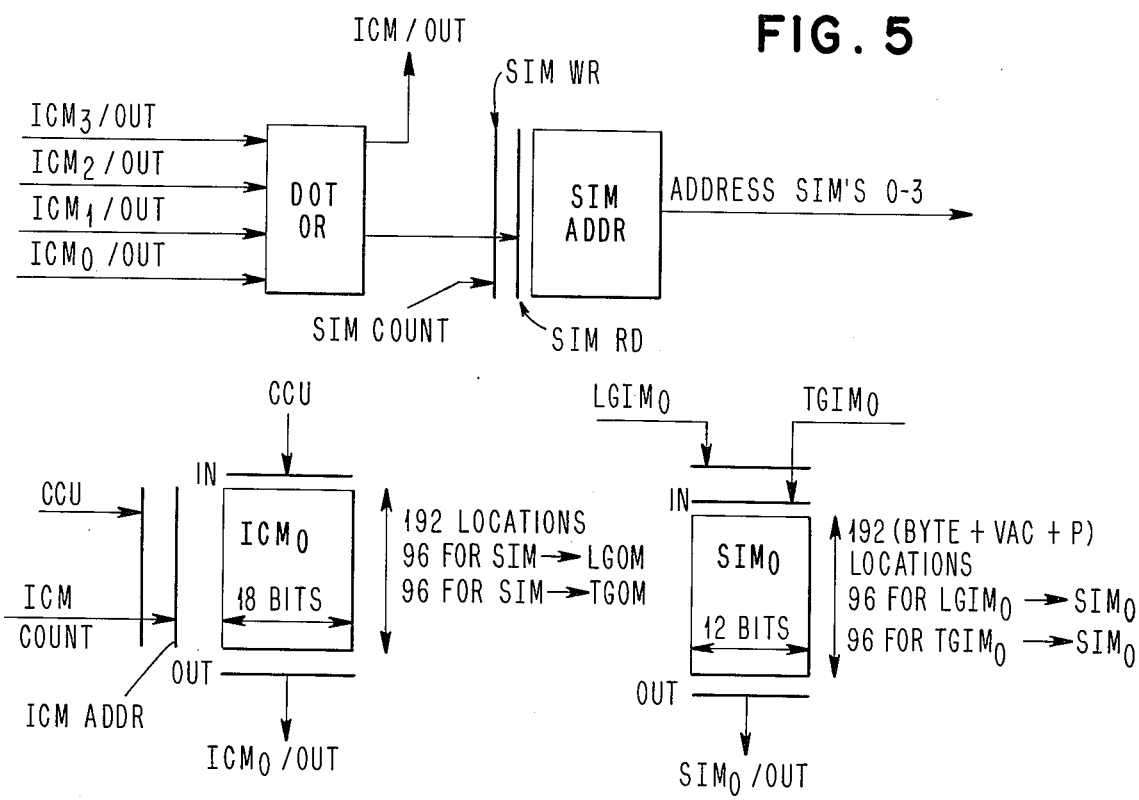
FIG. 5
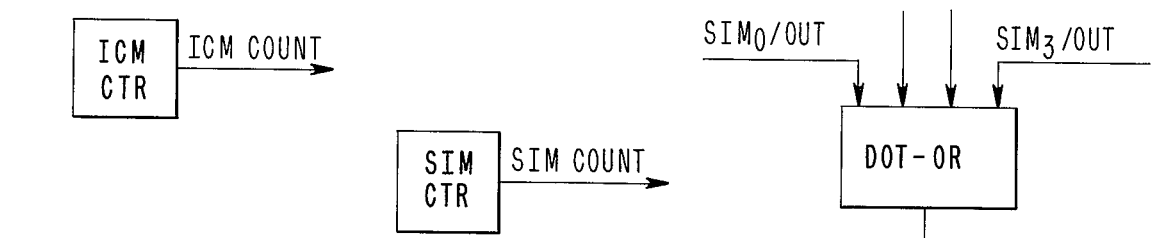
FIG. 6
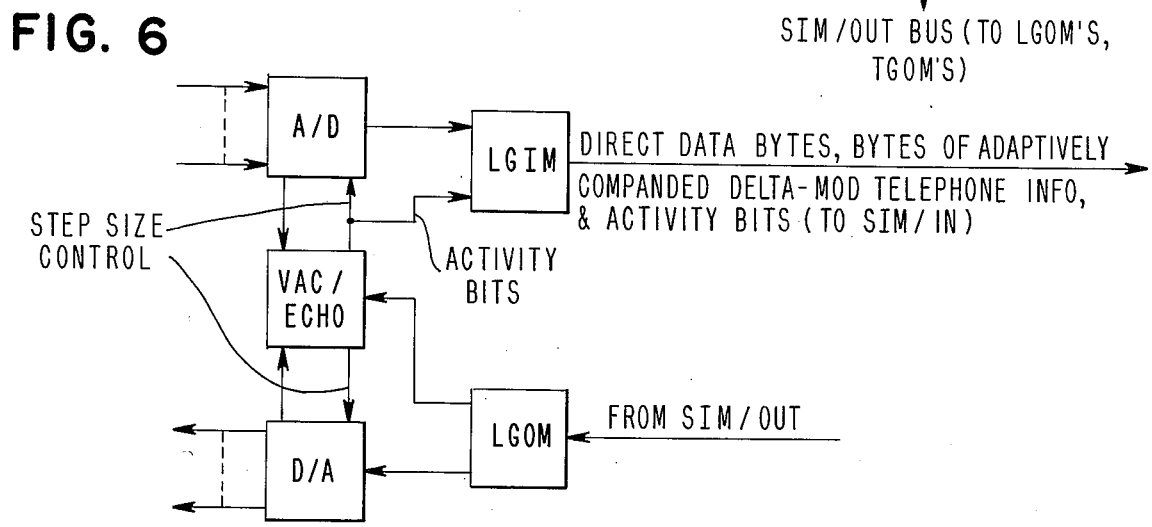

FIG. 10  TIME-INTERCHANGE FRAME STRUCTURE

FIG. 12 "TOLL" TELEPHONE CIRCUIT CONNECTION
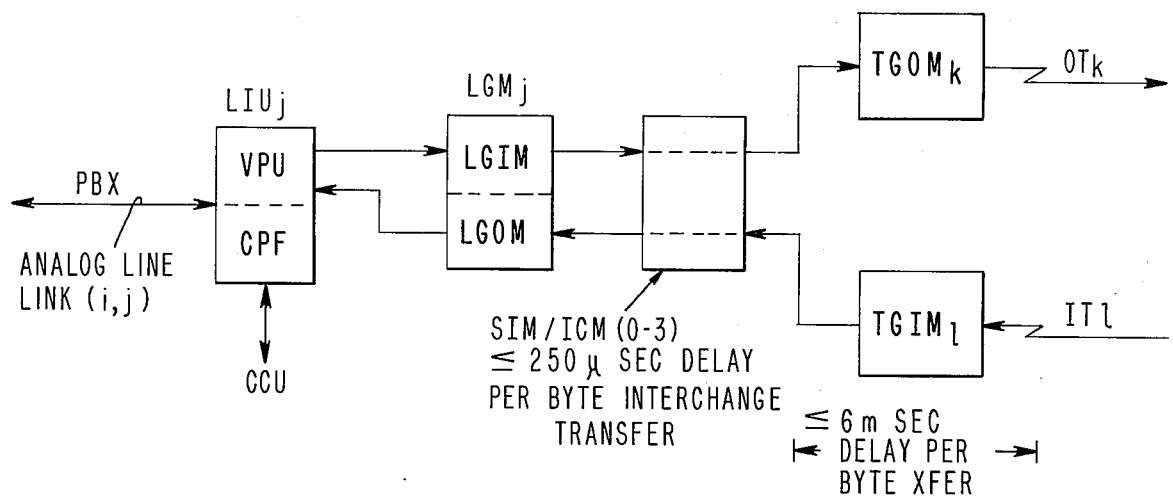
FIG. 13 "LOCAL","TANDEM" TELEPHONES CKT CONNECTIONS
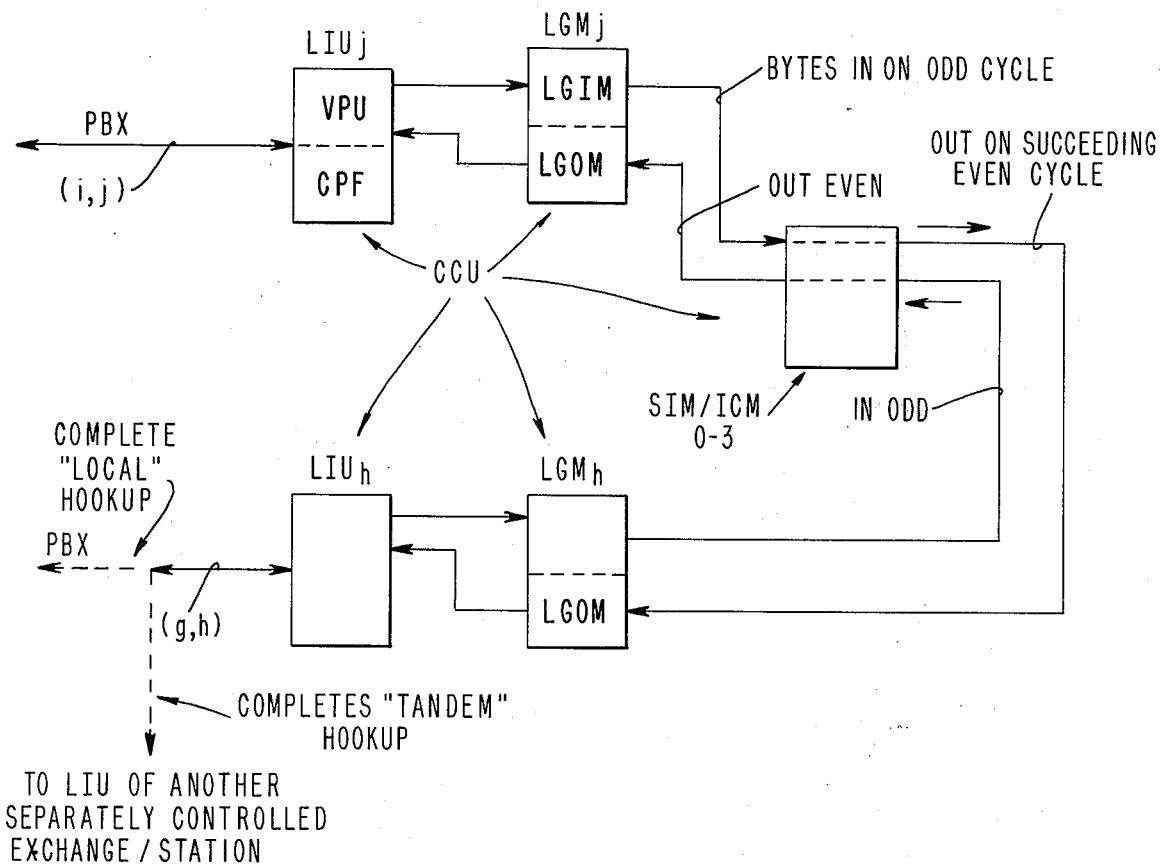

FREEZEOUT (PER TGOM MODULE)

MODULAR SLOT INTERCHANGE DIGITAL EXCHANGE

CROSS REFERENCES TO RELATED PATENT APPLICATIONS

U.S. Pat. application Ser. No. 537,211, filed Dec. 30, 1974, entitled "Access Method and Station Apparatus for Compressed Handling of Digital Voice and Data Signals Relative to a High Speed TDMA Facility" by H. G. Markey et al, assigned to the assignee of the present application.

U.S. Pat. application Ser. No. 537,502, filed Dec. 30, 1974, entitled "Access Method and Station Apparatus for Compressed Handling of Digital Voice and Data Signals Relative to a High Speed TDMA Facility" by D. C. Flemming et al, assigned to the assignee of the present application.

U.S. Pat. application Ser. No. 560,422, filed Mar. 20, 1975, entitled "Loss Signal Generation for Delta-Modulated Signals," by U. Appel, assigned to the assignee of the present application.

U.S. Pat. application Ser. No. 560,423, filed Mar. 20, 1975, entitled "Digital Voice Signaling With Digital Echo Detection and Voice Activity Compression Used to Cancel Echo," by P. Abramson et al, assigned to the assignee of the present application.

DEFINITION OF TERMS

The terms "TASI" (Time Assignment Speech Interpolation) and "VAC" (Voice Activity Compression) are used interchangeably herein to characterize a known technique for conservation of multiplex channels of communication in respect to telephone signal traffic; more specifically, it is a known technique in which a group of say $m$ recurrent channels on a multiplex link are dynamically allocated to a group of say $n$ (greater than $m$) repeatedly sampled telephone line circuits, by allowing only samples representing active speech to be passed through the channels and disallowing passage of samples representing inactivity ("conversational pauses"). In such systems the allocation in each sampling frame is identified to remote stations by transmission (in-band or out-of-band) of control signals representing instantaneous connection states of the $n$ source lines.

BACKGROUND AND SUMMARY OF THE INVENTION

An important factor in integrated network utilization of multiple high speed digital communication links (e.g. satellite, light, microwave, broadband cable, etc.) is the planning of common control station facilities to permit "globally" coordinated and balanced use of network link resources. When the traffic includes digitized telephone signals it is also desirable to be able to conserve link channels; e.g. by TASI and echo cancellation. This is complicated if the connection path in the high speed network includes multiple links in tandem and further complicated if the telephone signals represent adaptively companded delta modulation since it is then necessary to maintain equal companding (stepsize) levels at the remote companding stations serving the connection. Above all it is desirable to have modular link connection station facilities which can be expanded over a period of years to handle increasing traffic without requiring extensive re-work of existing components and control programs.

Due to cost-performance considerations station designs have been proposed which usually embody some but not all of these desirable attributes. The object of the present invention is to provide improved link connection apparatus having all of these capabilities and cost/performance effectiveness.

Apparatus according to the present invention comprises modular random access slot interchange memory units SIM/ICM providing buffered (or delayed) time interchange pairing associations variably between telephone/data line circuits and time channels of time compressed multiplex (TCM) links. A feature of the invention is that random access buffer spaces in each module are reserved for slot interchange of activity bits useful for control of TASI, echo suppression, companding levels of adaptively companded delta modulated telephone signals and network routing. Another feature of the invention is that the slot interchange units have timing and commoned (OR-dotted) connections for addressing and out-busing enabling $k$ independent switching tiers to operate as one unified switching facility; whereby an exchange constructed from said aggregate is expandable in port termination capacity and switching range, from the range/capacity of one unit to that of $k$ units with conservative cost/performance.

Station apparatus in accordance with the present invention also includes common controlled random access line group modules (LGM) and trunk group modules (TGM) for buffer storage of digital signals in passage between undivided line terminations of the station and time or frequency channels of multiplex link terminals of the station slot interchange connections.

Apparatus in accordance with the present invention is adaptive to be linked with multiplex analog/digital telephone signal conversion units, under common control.

Apparatus in accordance with this invention is arranged for simplified "vertical" aggregation of up to $k$ tiers of storage and conversion modules into a unified exchange served through the dot-OR'd slot interchange. An ancillary feature is that a variety of link connections may be established over the aggregate slot interchange range; including line-to-line (local or "tandem"), line-to-link channel ("toll") and link channel-to-link channel ("toll-tandem").

Apparatus as just characterized utilizes reserved time interchange slots of the SIM/ICM units to bidirectionally pass activity status information relative to associated traffic information slots served by these units. Furthermore such activity information is or can be used in the station for: a) telephone echo suppression; b) amplitude control in circuits carrying adaptively companded telephone signals; c) TASI; d) prioritized freezeout of TASI overloads; e) network routing; and f) network load balancing.

When compared to a more primitive satelite link TASI system disclosed in U.S. Pat. No. 3,644,680 granted Feb. 22, 1972, to Amano et al, the present TASI organization is distinguished in that: a) the present associations of lines and virtual channels (storage channels scanned by the controls for TASI allocation) are variable due to the time interchange switching; b) the interchange switch is expandable to serve plural multiplex links with separate TASI masks in a unified connection exchange (the Amano et al patent does not appear to have considered the need for this); c) the possibility of TASI overlod is considered presently and handled by prioritized freezeout of active virtual channels despite severe time restrictions inherently affecting such action (the Amano et al patent appears to have ignored overload possibilities, which implies settling for less than peak efficiency in use of the TASI channels); d) the present apparatus contemplates slot interchange switching of both traffic intelligence and activity bits used for TASI and echo suppression; e) present apparatus provides line-to-line, line-to-TCM link and link-to-link connection options with selective TASI control of link connections and resulting benefits of link and load balancing efficiency and reduced blocking of call connections.

Another feature is that the TCM frame time presently employed (e.g. 6 milliseconds) is long by comparison to the interval between successive samplings of any telephone line port (e.g. 1/32 of 1 millisecond). Consequently line port samples can be buffered and transmitted in multi-sample blocks for reduced transmission overhead (high ratio of traffic bits to synch and TASI mask bits).

Another feature is that present slot interchange storage modules operate to pass information in small byte pieces at a cycling tempo suitable for completing local line connections with short interchange delays and long distance connections with longer interchange delays (but short relative to link propagation delays); so that echo suppression is not required on short and medium distance connections.

Another feature of the invention is that the subject digital exchange station apparatus comprises one or more digital switch modules which can be independently hooked up to line multiples and multiplex trunks in vertical tiers and yet operate as a unified exchange for connecting any line in any tier with any trunk channel in any tier.

Another feature is that connection (interchange) operations of the exchange can be controlled by erasably stored tables which provide preferred and alternate route selection possibilities and virtual connection associations not restricted by any physical orderings of the lines and channels.

Another feature is that trunk channels can be used to full capacity without undue degradation of service, due to prioritized freezeout and network configuration control practices presently disclosed.

The foregoing and other aspects, features, advantages and objectives of the present invention will be more fully appreciated from the following description and claims.

DESCRIPTION OF THE DRAWINGS

FIG. 5 schematically illustrates the modular switch in more detail;

FIG. 6 schematically illustrates a telephone line interface arrangement useful with the subject invention;

FIGS. 12–14 schematically illustrate certain of the connection options provided by the subject invention.

DESCRIPTION

1. Introduction

Figure 1:
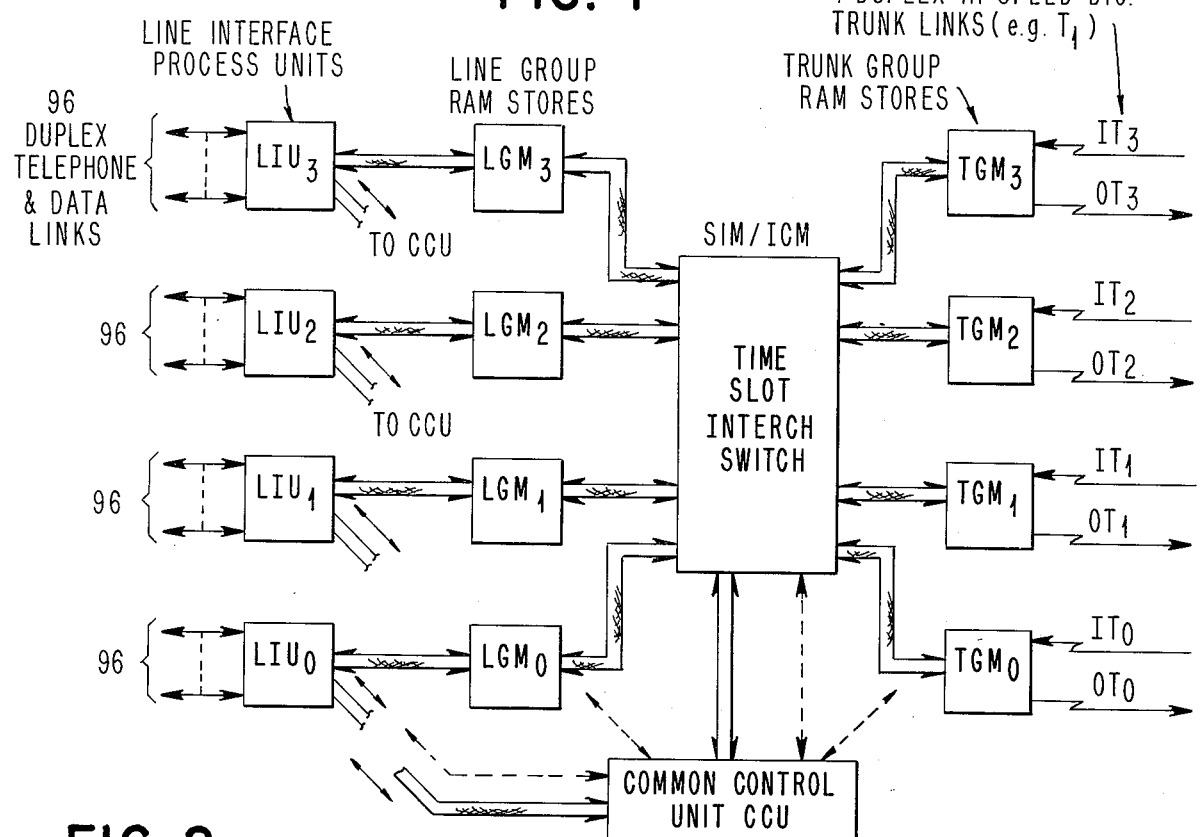
FIG. 1 schematically illustrates common control digital line switching apparatus arranged in accordance with this invention.

The present switch invention is described in the above cross-referenced application by Markey et al and useful in the satellite linked network system disclosed therein; the disclosure of said application being incorporated herein by this reference.

Voice activity detection and selective echo cancellation operations considered herein are also disclosed in said application by Markey et al, and disclosed and claimed in the above cross-referenced application by Abramson et al, which is also incorporated herein by this reference. The original aspect presently of concern is the performance of requisite activity tracking operations under constraints imposed by the interposition of time interchange switching between connectively associated lines and TDM/TCM channels.

Idle noise insertion and demodulation step-size adjustment techniques discussed herein are described in said Markey et al application and in the above cross-referenced patent application by Appel which is also incorporated herein by reference. The original aspect of present concern is the performance of requisite activity tracking operations under constraints imposed by the interposition of time interchange switching between the demodulation circuits and channels.

The invention (FIG. 1) is a time slot interchange station system and associated apparatus for constructing versatile, efficient and cost effective exchange stations, in a multi-access network for telephone/data communication served by multiple high speed digital links; each link designed to carry signals in time compressed multiplex (TCM) digital form. The subject station design contemplates duplex service of multiple high speed links per station with ability to perform selective activity compression (decompression) in allotment (demultiplexing) of link channels. The design further contemplates selective freezeout of undivided line activity relative to allottable channel groups by a technique which allows for multiple levels of priority in the selection of traffic to be blocked, notwithstanding severe time constraints inherently imposed on such selection by the system storage capacity and frame timing.

Station apparatus according to the invention comprises from 1 to $k$ ($k=4$ in the example to be described) modular connection subsystems constructed individually by tandem-linked random-access line (LGM), trunk (TGM) and slot interchange (SIM) memory arrays. These subsystems are integrated into a unified circuit-connection system by: a) association with a common control unit (CCU), b) time-coordinated cycling of the subsystem arrays, and c) common (OR-dotted) addressing and out-bussing of the interchange arrays.

SIM arrays are provided in paired association with Interchange Control Memory (ICM) arrays. The ICM locations contain errasably stored information supplied by the CCU for addressing SIM locations for read (RD) output operation. The SIM's are addressed for write (WR) input operations by a sequentially incremented counter. The ICM, LGM and TGM arrays are also addressed by sequentially incremented counters. Thus the content of a SIM line or trunk storage slot location received in positionally ordered association from a line or trunk channel can be passed to virtually any line or trunk output port position of the system in an arbitrary order association.

The CCU maintains tables of preferred and alternate connection routes and communicates via the line interface units LIU (FIG. 1), and via network circuit connections set up through the respective station and its multiplex trunk links, to process call dial-up information originated at line ports of any network station into ICM entries representing reserved circuit connection segments in the respective station (reference said Markey et al application). Activity bits passed through reserved SIM activity slots of such circuit connections are used to control activity compressed allotment and de-allotment of high speed network multiplex channels.

The LIU units interface with individual analog PBX telephone lines and digital data lines via station line ports. Analog telephone sound signals are converted by the LIU to digital form (e.g. adaptively companded delta modulation). Telephone and data line input signals are passed in bit serial digital form to input storage sections LGIM of respective line group memory LGM arrays (FIGS. 1, 2) for handling in bit-parallel byte serial units relative to respective line group slot locations of respective SIM arrays. Concurrent RD operations relative to the SIM arrays transfer previously stored trunk input bytes to output sections (LGOM, TGOM) of either line (LGM) or trunk (TGM) arrays.

In the opposite direction inputs received from input trunks IT are staged in input sections (TGIM) of respective Trunk Group modules TGM in 24-byte (192 bit) units per trunk input channel and passed in single byte units per channel to respective assigned trunk slot locations of respective SIM's while previously stored line input bytes are concurrently passed to the LGOM, TGOM output arrays for output handling relative to output line ports and output trunks OT.

Output bytes in LGOM are passed bit-serially via LIU units to line ports out with appropriate digital to analog conversion of telephone signals. Outputs of TGOM are staged in 24-byte (192 bit) units per virtually connected line assocation for transmision on channels of respective OT's.

Activity bit information interchanged with the port traffic is utilized to control activity-dependent allotment of the OT channels to TGOM traffic; there being insufficient channels in the aggregate OT capacity to handle the aggregate traffic of all of the line ports in. If the active traffic in a TGOM exceeds the channel capacity of the respective OT, logic of the respective subsystem (tier) performs selective freezeout to effectively block transmission of excess active traffic (which is thereby over-written and lost or discarded). The selection which must be accomplished in a very short time, effectively orders the outputs in multiple priority groups so that data has top priority for transmission and continuing activity has priority over just-starting activity (talkspurt-rise).

Digital (Slot Interchange) Switch Description

1 Switch Architecture

Figure 2:
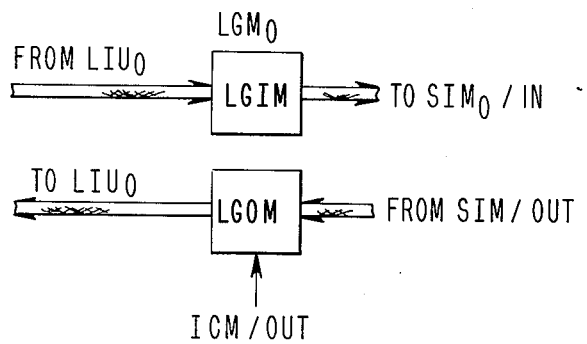
FIG. 2 illustrates a line byte buffer storage module for use in the invention.
Figure 3:
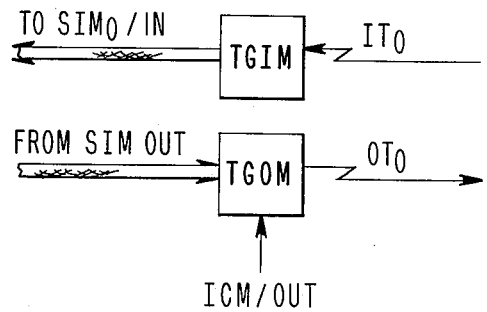
FIG. 3 illustrates a trunk block buffer storage module for use in the invention.
Figure 4:
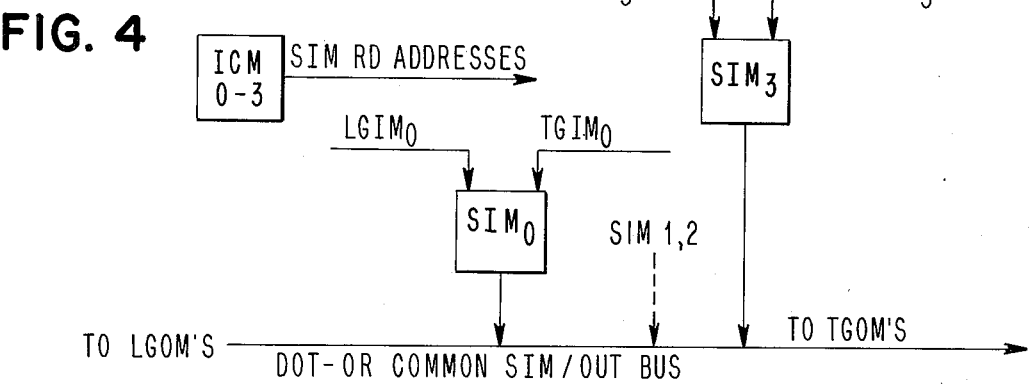
FIG. 4 schematically illustrates the subject modular switch.

The Digital Switch (FIGS. 1-5) is programmed for connection by the CCU. Input traffic at line ports of the switch consists of data or analog voice which has been preprocessed in the LIU by respective data adapters or voice processing hardware (for predictive delta-modulation analog-to-digital/digital-to-analog conversion with companding/decompanding, voice activity detection, echo cancellation and receive/output gain offset; all described in said Markey et al application and only ancillarily relevant to the presently described invention). FIG. 1 shows the general structure of a switch with a full complement of four vertical module tiers. FIGS. 5-8 provide a more detailed view.

1.1 Switch Components

1.1.1 Ports

On the left side of FIG. 1 are shown 96 "line" ports per LIU, LGM module. Each port is full duplex and sustains a 32 KBS data or telephone rate. The input (transmit) side of a port is referred to as "port in" and the outpt (receive) side as "port out". Under program control, ports may be individually selected to interface with voice processing or data adapter hardware.

1.1.2 LGIM/LGOM

The Line Group Input Module (LGIM) contains 96 one byte wide shift register locations, one for each port and serves to deserialize the bit stream at each (sending) port in into byte (8-bit) units for bit-parallel, byte serial transfer to respective line slot locations of respective SIM's. The Line Group Output Module (LGOM) performs the inverse serialization function for port handling. The LGOM contains 96 one-byte wide shift register locations which serialize switched traffic to respective ports out.

1.1.3 Trunk Port/Real Channels

On the right side of FIG. 1 are shown ports interfacing with high speed digital trunk links IT, OT, (Input Trunks, Output Trunks). Each port pair is a full duplex serial by bit interface operated at 1.544 MBS. One out of every 193 bits (8 KBS) of the bit stream is used for synchronization, leaving an effective 1.536 MBS for data transmission. Digital traffic is represented on the trunk facility in units called frames. A frame (FIG. 10) is 6 ms in length and contains 48 Real Channels (RC) also termed Trunk Channels (TC). Each real channel is composed of 24 bytes (192 bits) and operates at an effective 32 KBS rate. A synchronization (193rd) bit is inserted between channels.

1.1.4 Virtual Channels

A Virtual Channel (VC) is defined as a 32 KBS channel which may be transmitted or received on a real channel RC of a high speed digital trunk. Each switch module supports a group of 96 VC's out for trunk transmission and a group of 96 VC's in for reception. The association between VC's and the line ports in the aggregate of all tiers is arbitrary and subject to CCU-/ICM control.

1.1.5 Voice Activity Compression (VAC)

As mentioned previously VAC is a compression (TASI) technique for voice. Voice Processing (LIU) hardware senses activity of voice telephone and data line ports and passes activity indications (VAC bits) to the switch.

The switch contains a mechanism which maps the 96 VC's out onto real channels (RC's ) out at the transmission side of each trunk out interface. On the receive side of each trunk in interface VAC inversely maps received RC's in into the 96 VC's in.

In the present example the high speed trunk frame contains only 48 RC's. Hence the TASI compression ratio is two in order to properly link the 96 VC's at each trunk interface with RC's. VAC operates by choosing a subset of the 96 VC's out at each trunk out interface, each frame time, and compressing them into the 48 RC's out. Chosen for transmission by VAC are those VC's that are "active," that is, channels that have either data or "talkspurt" information present. Activity is indicated by a single control bit for each VC out. If more than half of the channels are active during a given frame, VAC employs a prioritization algorithm discussed below to eliminate or freeze out the virtual channels which are in excess of the frame capacity. In order to indicate which VC's are transmitted each frame time, it becomes necessary to define and transmit a VAC mask (FIG. 9) at each interface. The transmitted VAC mask is a 96-bit quantity sent together with 96 forward error correction (FEC) redundant bits over a dedicated real channel RC1 (or TC1) of the frame. The positions of the bits in the mask in time progression are associated with respective numerical positions of the 96 VC's, 0 to 95, respectively. The state of the mask bit (1 or 0) represents the activity state of the associated virtual channel, i.e. active or inactive. Since the VAC mask transmission requires a real channel, the 96 VC's out must be compressed into the remaining 47 real channels out.

1.1.6 TGOM/TGIM

Figure 7:
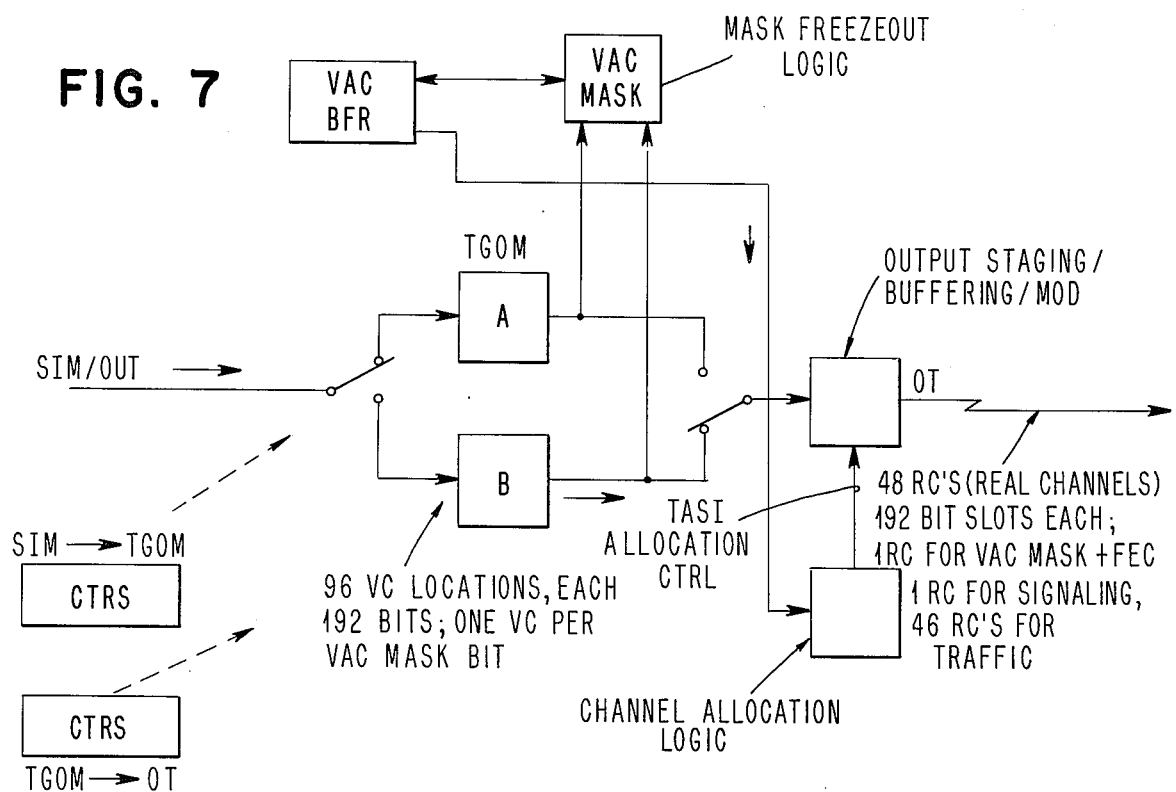
FIG. 7 is a schematic of VAC (TASI) channel allotting circuits interfacing with one module section of the subject switch.
Figure 8:
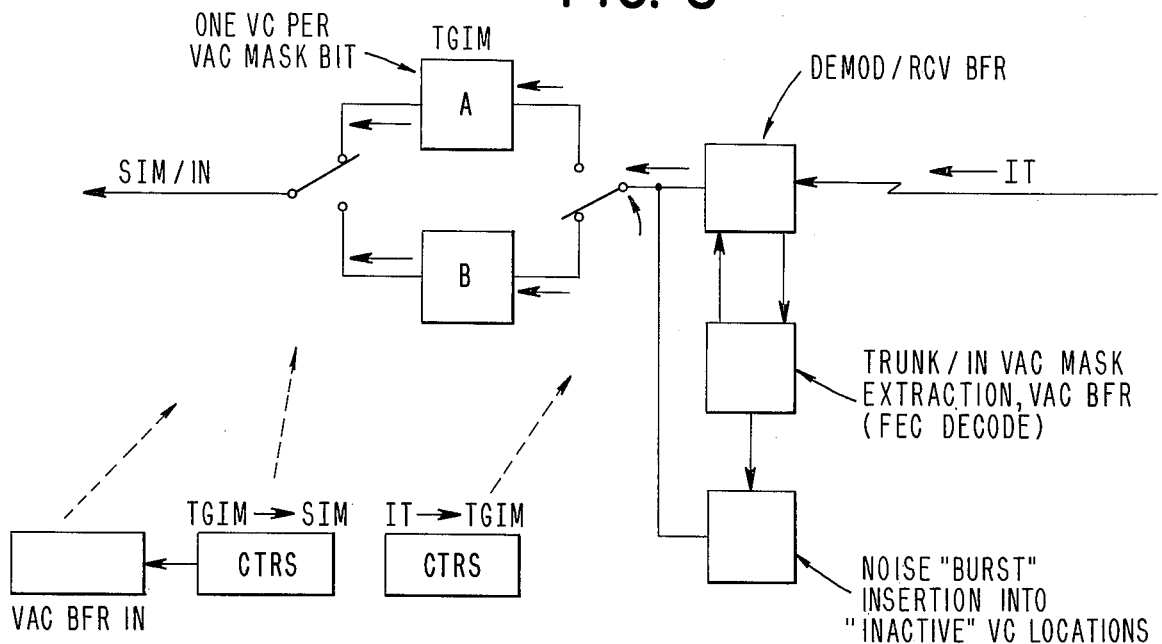
FIG. 8 is a schematic of the circuits for passing traffic from TASI-allotted channels to a module section of the subject switch.

The Trunk Group Output Module (TGOM) as seen in FIG. 7 serves to buffer 96 VC's out exiting the switch via the trunk out interface. The TGOM is an A/B buffer; each side containing 96 × 24 byte locations for storing 24 bytes for each of the 96 VC's out. In each frame one side of the buffer is loaded from SIM while the entire content of the other is transmitted on the respective trunk out (OT). Sides are alternated in successive frames so that as one side is loaded, the other side is activity compressed and transmitted on trunk channels TC0 and TC2-49, preceded by the associated VAC mask sent over TC1; inter-station control signaling information occupying TC0.

The Trunk Group Input Module (TGIM) buffers the 48 real channels entering the switch via the respective IT (trunk in) interface for handling to SIM. Like the TGOM, the TGIM is an A/B buffer. But each side contains only 48 × 24 byte locations for storing a frame of 48 RC's of received information for distribution via SIM/ICM and LGOM to 96 VC's and 96 respective line ports out. Loading and switch interfacing alternates between the two sides every 6 ms frame. While RC's are loaded into one side from the trunk in, RC's stored in the other side are demultiplexed out into VC's of SIM under VAC mask control. In this case VAC control performs the inverse function of compression. The received VAC mask stripped of redundancy is used to expand the received real channels stored in the TGIM into 96 VC's in of SIM. For VC's that are active, information from the corresponding real channel is used as data. For a VC that is inactive, i.e. no assignment to a real channel, idle noise is inserted as a "filler" (refer to the cross-referenced application by Appel in respect to the utility of this).

1.1.7 SIM

The Slot Interchange Memory (SIM), the "heart" of the Digital Switch, is the point at which switching occurs. Each SIM module is a random access memory containing 192 12-bit wide locations logically divided into two parts. One half [locations LG(0)-LG(85)] is loaded from the LGIM and contains a unique location for each line port in (i.e. for each LGIM location) for storing one traffic byte and an associated activity bit developed in the LIU. Data is transferred into this half in odd channel times of the 6 ms slot interchange frame (FIG. 11) during which a new byte is accumulated in the respective LGIM from each of the 96 ports in.

The other half of the SIM [locations TG(0)-TG(95)] is loaded from the TGIM in even channel times of the interchange frame and contains a location for each trunk VC in for holding a traffic byte and associated activity mask bit. In successive even channel times data is written into this half of the SIM from a different byte position of each of the 48 RC's previously in TGIM and from an idle noise source in the case of inactive VC's (reference said Appel application).

1.1.8 ICM

Outputs from the LG half of each SIM may be directed to arbitrary locations in any TGOM or LGOM under control of the Inter-Connect Memory (ICM) arrays. The ICM arrays are loaded by the CCU. Each ICM is two bytes (plus 2 parity bits) wide and may be considered logically divided into two parts; one containing 96 2-byte TG locations used to control loading of TGOM's and the other containing 96 locations to control LGOM loading. Each TG location is implicitly associated with one of 96 VC's out. The content of an ICM location contains an address pointer which is used to address a SIM location. Since the ICM location contents are set up variably by the CCU any line port in or VC in may be switched to any VC out of any TGOM array simply by placing the port in or VC in address, of the LG or TG SIM location to be switched, in the ICM location corresponding to the VC out. Thus the association between ports or VC's in and VC's out can be varied to suit system requirements for connection routing.

The LG control half of the ICM module controls the loading of LGOM's from any SIM array. Each location is implicitly associated with one of 96 line ports out. As before, each location contains space for storing an address pointer used to address any location in any SIM array. Any VC in or port in may be switched to any LGOM port out by placing the VC in address of the associated TG or LG SIM location in the ICM location corresponding to the LGOM port out.

Although the halves of the SIM modules are logically separate, they are implemented in a common memory with coordinated inter-module timing and commoned (OR-dotted) connections to the modules for addressing and LGOM/TGOM out-busing. Thus it is possible to perform port to port, port to trunk, trunk to port and trunk to trunk switching at the SIM over the aggregate addressing range of all SIM modules.

1.2 Switch Expansion

Switching capacity may be expanded from a single tier base by "vertically" adding tiers of LIU, LGM, SIM, ICM, TGM module nets to the base tier configuration. The maximum configuration for the present example of trunk and module data rates is a four tier stack serving 384 full duplex line ports and four duplex multiplex trunk ports. The integration of the individual tiers into a unified exchange is accomplished by interconnecting (OR-dotting) the address and out-busing lines of the individual SIM's to form a common switching node and OR-dotting the ICM outputs to enable any ICM to address any SIM location. The ICM contents are arranged so that no two ICM locations point to the same SIM location. By providing addressability from each ICM to all SIM locations the expanded circuit supports inter as well as intra SIM module switching.

1.3 Switching Functions

With the switching system generally described above four basic switching functions are possible and are summarized below.

1.3.1 Port in to VC out

Any of up to 4 × 96 ports in may be switched to any of up to 4 × 96 VC's out. This connection can be used to switch data or voice traffic from data sets or PBX's respectively to a VC out on the Digital Trunk interface.

1.3.2 Port in to Port out

Any of up to 4 × 96 ports in may be switched to any of up to 4 × 96 ports out. Connections of this type are used primarily for local calls within a locally defined network.

1.3.3 VC in to Port out

Any VC in may be switched to any port out. This connection is used to switch incoming data or voice from a digital trunk interface to a port out.

1.3.4 VC in to VC out

Any VC in may be switched to any VC out. Connections of this type would be primarily useful in a toll-tandem hookup where the subject station serves as an intermediate node interconnecting VC's of the same or different trunks.

Switch Hardware

2.1 1.544 MBS Digital Trunk Interface

The trunk interface port presently illustrated is a digital link on which private network traffic is communicated in time compressed multiplex (TCM) digital form, with further compression by TASI allotment of trunk channels. The trunk interface operates at a standardized 1.544 MBS rate suitable for communication over T1 type telephone lines. This is exemplary only and not a limitation on the interface applications of the invention.

2.2 Frame Structure and Alignment

2.2.1 Frame Description

A frame (FIGS. 9-11) is the time division unit in which data is transmitted over the 1.544 MBS trunk facility. A frame is 6 ms in length and consists of a total of 9264 bit time slots.

2.2.1.1 Real Channels

The frame is composed of 48 real channel (RC's). Each RC contains 24 byte (192 bit) slots for information and has an effective bandwidth of 32 KBS.

2.2.1.2 193rd Sync Bit

Frame synchronization (sync) bits are inserted between successive RC's. The sync bits are used to define frame and channel boundaries. For every 192 bit slots used for data (traffic) transmission (one channel), a sync bit slots is provided. The latter represents 1/193rd of 1/544 MBS or 8 KBS. The remaining bandwidth of 1.563 MBS or 192/193rd of 1.544 MBS is utilized by the 48 32 KBS channels.

Figure 9:
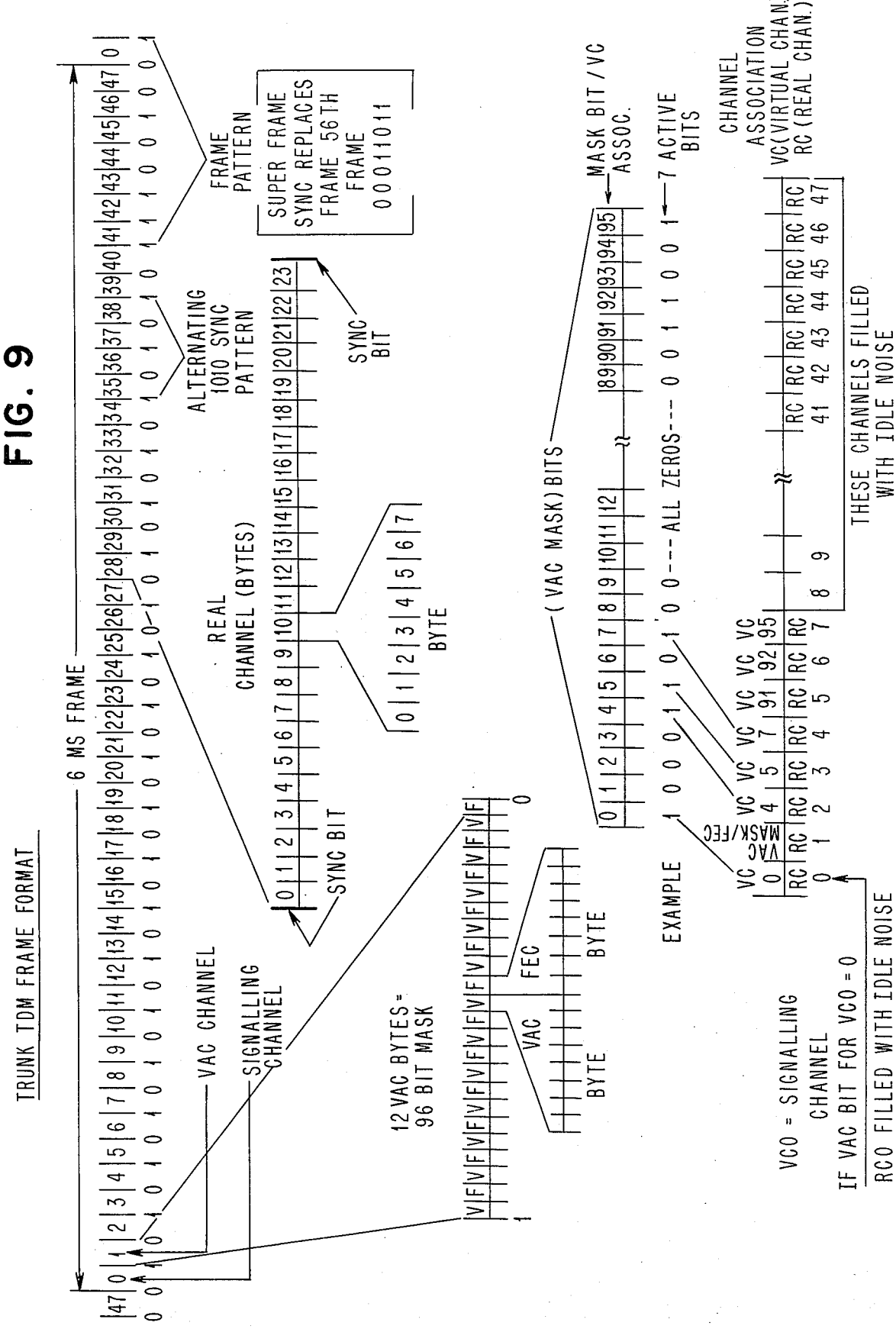
FIG. 9 graphically illustrates frame timing and VAC (TASI) allocation and signaling, relative to a single multiplex trunk, in accordance with this invention.

The first 40 sync bits are an alternating 1010 — pattern as shown in FIG. 9. The last 8 sync bits of a frame consist of a frame or superframe sync pattern used for multi-access purposes described in said Markey et al application. The frame sync pattern is used by synchronization hardware to determine frame boundaries.

2.2.1.3 Signaling

Channel 0 (TC0) is reserved for signaling or communication between station systems linked by the respective trunk line.

2.2.1.4 Voice Activity Compression (VAC) Mask

The VAC mask is a 96-bit mask formed in each VC group which describes and is used to control the allocation of the respective 96 VC's to the 47 RC's of the respective trunk (see FIG. 9). The VAC mask is protected in transmission by a Forward Error Correction (FEC) code. The VAC mask and its associated FEC are transmitted in real channel 1 (TC1) on the respective trunk. Hence this RC is reserved and cannot be assigned to any VC. The mask applies to the remaining 47 other RC's transmitted on the respective trunk in the same frame (i.e. RC's 0 and 2–47).

The position of a bit in the mask implicitly defines the allocation of RC's to associated VC's; i.e. the first VAC bit in the mask associates to VC0 and defines the allocation or non-allocation of an RC to VC0. Likewise the 96th VAC bit defines the current allocation or non-allocation of an RC to VC 95. If the VAC mask bit is 1 and RC is assigned to the respective VC and if the bit is 0, and RC is not assigned. The RC assignments are ordered in the positional sequence of 1 bits in the VAC mask; except that RC 0 is alwasys reserved for VC0 (i.e. if the lst VAC bit 0 RC0 is unused). The remaining 95 bits of the mask describe the allocations of up to 46 of the active VC's in the group VC1-VC95, to RC's 2–47 in ascending order. If more than 46 VC's are active, some of the VC's are "frozen out" according to a "freezeout" algorithm described later. If less than 46 VC's are active, they are all assigned successive RC's starting with RC2. Unused RC's are filled with idle noise. An example of the VC to RC assignment for a frame of 7 active VC's is shown in FIG. 9.

The VAC mask is protected with FEC with a (16, 8) block code. For each byte of the VAC mask, a corresponding byte of FEC is transmitted. The 12 VAC mask bytes are transmitted in the 12 even byte positions of real channel 1 as shown in FIG. 9. The 12 FEC bytes are interleaved with the mask bytes and transmitted in the odd byte times. Each VAC byte is directly followed by its associated FEC byte.

2.2.2 Trunk Phase Correction

Trunk phase correction is a process whereby incoming trunk frames are aligned with the frame structure generated by the Timing System of the respective station tier (subsystem). The correction is a three step procedure consisting of the three following mechanisms.

2.2.2.1 Bit Synchronization

Bit Synchronization synchronizes bits received from the trunk with subsystem bit clocking. If the frequency of the incoming bits is identical to the subsystem bit strobe clock, Bit Synchronization amounts to a constant phase adjustment. The incoming bit stream is delayed by a constant amount such that a valid bit sample time is coincident with the bit strobe clock. The above is the case for one subsystem tier.

When two or more tiers are interconnected together, tier timing is derived from one of the trunk lines which is designated as master. Any one of the trunk lines may be chosen as master under program control. The 18.528 MHZ clock generated by a VCXO of the master trunk is used to derive the entire system timing structure which causes each tier to be phase locked with the master trunk. Since the other connected trunks must be bit synchronized with the system clocking, it is necessary to account for short and long term differential frequency variations between the master trunk line and the other trunk lines.

In order to achieve bit synchronization for the two cases cited, a 32bit elastic buffer may be provided as disclosed in said Markey et al application.

2.2.2.2 Byte Correction

In the station system, trunk in information is initially stored in the Phase Buffer on a byte basis. Therefore the serial by bit trunk interface traffic is aligned in phase into byte wide units. Byte phase adjustment cannot be performed until Frame Synchronization is achieved since the synchronization bits define channel boundaries and therefore byte boundaries. Frame and byte Synchronization are described in said Markey et al application.

2.2.2.3 Frame Correction

Frame Correction is the process whereby incoming bytes are adjusted in phase so that the entire incoming frame is aligned with the frame structure generated by the station timing. The function is accomplished as described in said Markey et al application.

2.2.3 Frame Synchronization

After the incoming trunk data stream has been bit corrected, frame boundaries are located by searching for the 193rd sync bit. After frame synchronization is achieved, byte phase adjustments and frame phase adjustment are made, i.e., frame synchronization hardware provides control signals for byte phase and frame phase correction.

2.3 Timing System and Clock Distribution

Figure 10:
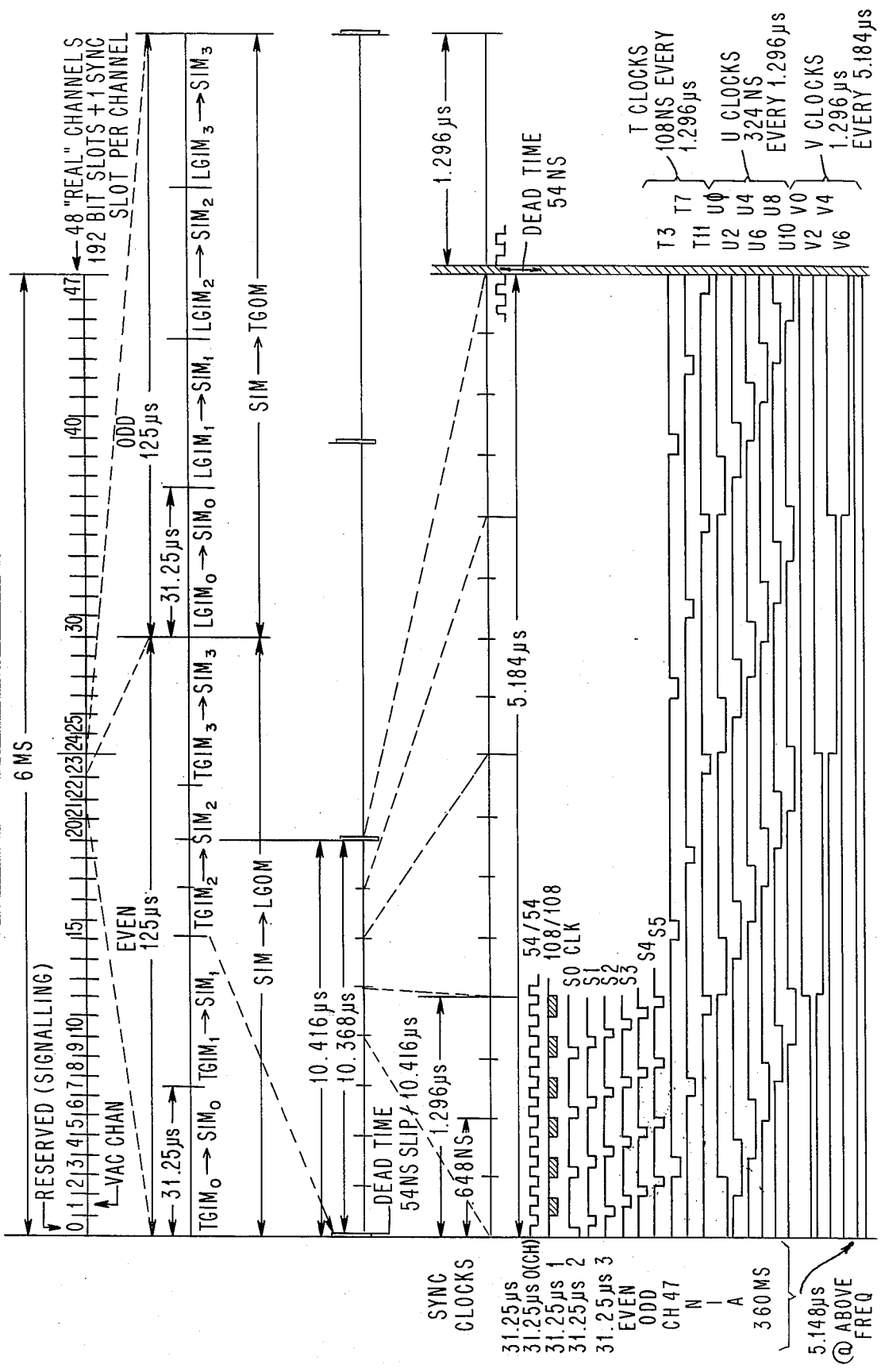
FIGS. 10, 11 and associated charts included in the following text graphically depict the operation and timing of the subject slot interchange switch.

A hierarchy of clocks used in the station system are depicted in FIG. 10. The 6 ms frame structure is basic to the exemplary system and consists of 48 125 $\mu$ second channel times, each divided into four equal 31.25 $\mu$ second segments. Each segment is divided into three 10.416 $\mu$s periods. Within the 10.416 $\mu$s period, two 5.184 $\mu$s periods are developed plus a 54 ns dead spot. The 54 ns dead time is used to accomplish the 1.544 MHz to 1.536 MHz conversion. There are 12 dead spots in a channel time (125 $\mu$s) which is equivalent to one 648 ns bit time on the trunk line.

All events within the station/switch occur at precise times within the frame and are controlled by the clocks developed within the frame structure. The 5.184 $\mu$s period contains various clocks which are described in the next sections.

2.3.1 Clock Descriptions

2.3.1.1 18.528 MHz Clock

All timing originates from a single clock phase locked to incoming data on the trunk which runs at exactly 12 times the 1.544 MBS data rate, i.e., 18.528 MHz. The clock is generated by a VCXO as described in said Markey et al application.

2.3.1.2 192/193 Clock and 193rd Sync Clock

Data is transferred over the trunk interface at an overall rate of 1.536 MHz. The 18.528 MHz clock is exactly 12 times 1.544 MHz which is the bit rate on the trunk line (including the 193rd sync bit). The 18.528 MHz clock is reduced in frequency by 1/193 to generate the requisite 192/192 clock by removing one out of every 193 pulses.

The 192/193 clock is derived from a mod 193 counter in conjunction with a decoder for the 193rd state. The 193rd pulse which is deleted is used as a sync clock and contains one pulse for every 193 pulses or one pulse per 10.416 $\mu$s. The 192/193 and the 193rd sync clock are used to develop all subsequent clocks which relate to 1.536 MHz.

2.3.1.3 54/54 NS Clock

The 192/193 clock is divided by two to produce a clock with a 108 ns period. As seen in FIG. 10, the 54/54 clock contains a half cycle of "dead time" evey 10.416 ns due to the missing pulse in the 192/193 clock.

The 54/54 clock is distributed directly to the voice processing hardware in the LIU's. The clock is also used as a source for further clock development within the digital switch.

2.3.1.4 108/108 NS Clock

This clock is derived in parallel with the 54/54 clock from the 192/193 clock. The clock is distributed to the call processing hardware and is also used to produce the U clocks.

2.3.1.5 S Clocks

Six clocks are generated from the 54/54 ns clock with a modulo six grey code counter. Each clock consists of a 54 ns pulse which occurs every 324 ns. The six clocks are offset from one another by 54 ns. These clocks are primarily used in conjunction with others to generate the clock input to registers and counters.

2.3.1.6 U Clocks

Six U clock are generated and each consists of a 324 ns "window" which repeats at a 1.298 $\mu$s rate. The U clocks are derived from the 108/108 ns clock.

2.3.1.7 V Clocks

Four V clocks are developed from the S and U clocks and are synchronized by the 193rd sync clock. Each clock is a 1.296 μs window and repeats every 5.184 μs.

2.3.1.8 Frame Sequencer/Sync Clocks/Channel Windows

Frame sequencer hardware described in said Markey et al application develops all timing events with periods greater than that of the V clocks. The frame sequencer counts superframes, develops the 6 ms frame structure, and provides sync clocks and channel windows which define events within the frame.

Twelve sync clocks are developed and are listed below. Each sync clock is a 5.184 μs window which repeats at the described intervals.

a. 31.25 μs sync — This clock repeats every 31.25 μs, i.e. a 5.184 μs window every 31.25 μs.

b. 31.25 μs 0,1,2 and 3 — These four sync clocks repeat every 125 μs and start on boundaries as shown in FIG. 10.

c. Even and Odd — These two sync clocks define the beginning of even and odd channels and repeat every 250 μs.

d. Ch 47, 0 and 1 — These sync clocks define the beginning of the stated channels and repeat every 6 ms.

e. 336 ms sync — This sync clock defines the beginning of a superframe.

f. Channel Windows — Special events occur in channels 47, 0 and 1 with regard to the VAC mask preparation and its outgating. Therefore, three channel windows are developed. Each window is 125 μs wide and repeats on a 6 ms basis within the frame structure.

2.3.1.9 Trunk Clocks

The clocks and all timing discussed in the previous sections were derived from the 192/193 clock. Therefore, the 54 ns dead time every 10.416 μs appears in all of the clocks which adjusts the 1.544 MHz rate down to an effective 1.536 MHz for data. The trunk clocks are used to ingate data from the trunk and outgate data onto the trunk with the sync bit included. Thus, the clocks cannot be developed from the 192/193 clock since the 1.544 MHz rate is needed in order to accommodate the sync bit.

The 192/193 clock and the 193rd sync clock are "OR'd" together to reconstruct the basic 18.536 MHz clock. This clock is divided down to develop six C clocks with repeat every 648 ns and are 108 ns wide. The C clocks are used to drive the elastic buffer, the frame synchronizing hardware, and the trunk outgating. The C clocks are synchronized to the 192/193 clock with the 193rd sync clock pulse.

2.3.2 Clock Usage

With the hierarchy of clocks described, it is possible to develop pulses of various widths and periods by "ANDing" different combinations together. This allows for a flexible clocking system and provides a means for centrally controlling the various events which occur in the station tiers.

2.3.3 Clock Synchronization

All of the clocks described are closely synchronized with one another to insure proper operation. Sync pulses are continually sent to various parts of the machine which guarantees that all clocks within a switch tier as well as between tiers are always aligned correctly. If a clock for some reason "skips a beat" it will be resynchronized with its next sync pulse.

2.3.4 Interconnected Switch Tiers

When tiers are interconnected, basic clocks are provided to all tiers by the timing system of the tier designated as master. The master generates the 192/193 clock and the 193rd sync clock from its 19.582 MHz clock. The 192/193 clock and the 193rd sync clock are distributed from the master to each tier and also to itself. In addition, a 336 ms sync pulse (54 ns) is distributed from the master to synchronize each tier's frame sequencer. These three clocks are the only timing information communicated between tiers. Each tier derives all other clocks from these three basic timing sources.

2.3.5 Tier Identity

Up to four switch tiers may be interconnected. These are identical to one another except for the times in which certain events occur within the frame structure. Each tier's timing may be made unique with jumpers on the tier cards which cause the tier to assume an identity of zero, one, two, or three. Interconnected tiers must have mutually exclusive identities. The identity of a tier dictates where its frame structure starts with respect to an absolute frame of reference, i.e. the timing within the frame structure. The frames are offset from one another for reasons which are described below.

Figure 11:
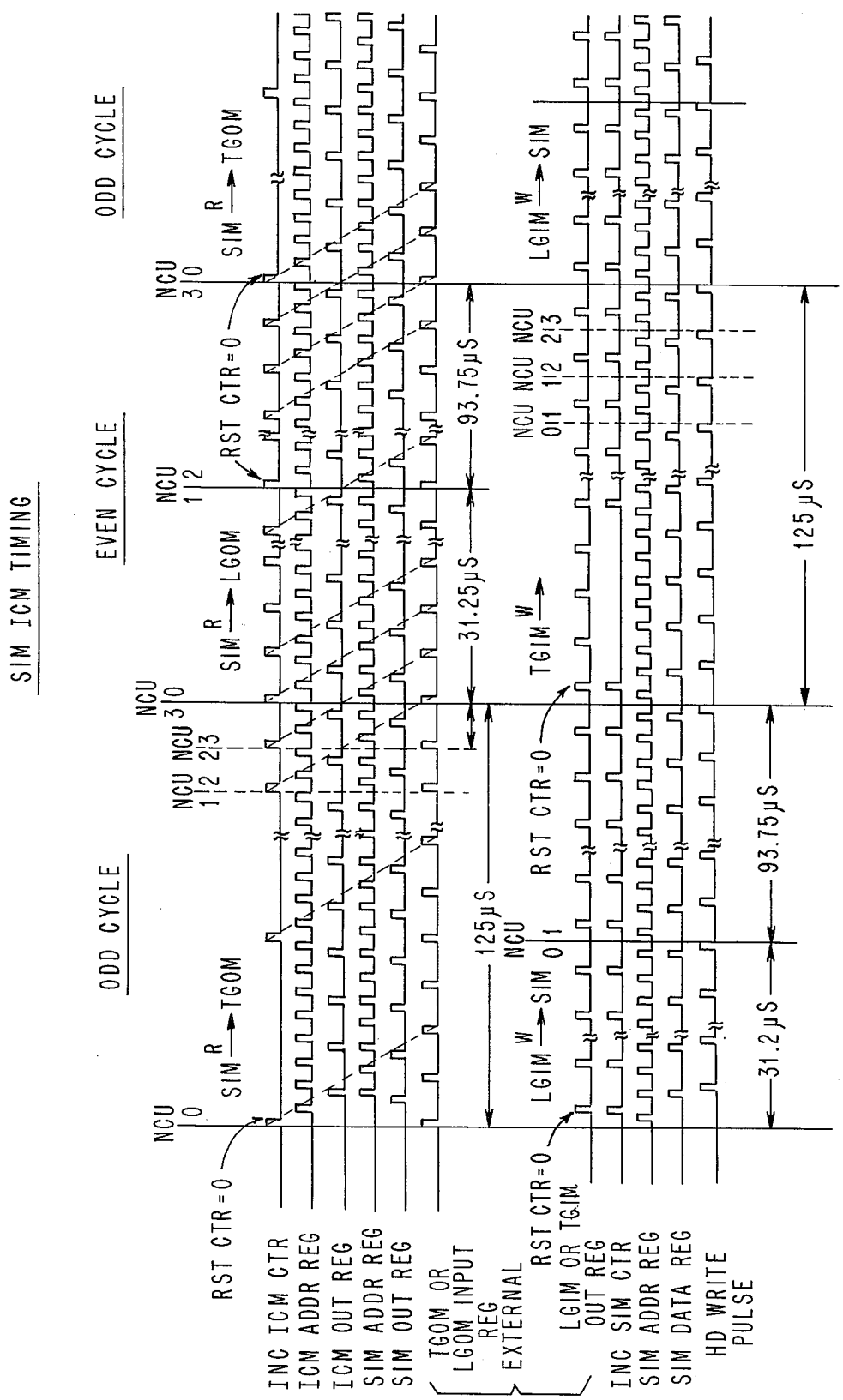

2.3.6 Switch Transfer (FIG. 11)

In each channel time the SIM tiers are cycled through 96 WR and 96 RD byte transfers in respective 31.25 μ sec quadrants. RD transfers are offset from respective WR transfers by 162 n sec. In odd channel times bytes are written at 324 n sec intervals into successive LG locations of SIM from respective successive locations of LGIM, while concurrently bytes are read out at 324 n sec intervals, from ICM-addressed TG or LG locations of SIM (written in previous channel times) into successive LGOM locations. In even channel times 96 bytes are written into successive TG locations of SIM from successive locations of TGIM while concurrently bytes are read from the variously specified (by ICM) SIM locations (TG or LG) into successive TGOM locations. Thus, bytes are interchanged between line port and VC slots according to any connection schedule set up in the ICM's.

The ICM's are addressed by the ICM counter (FIG. 5) which is sequenced modulo 384 over each channel time in combination with the SIM counter. The contents of successive ICM addresses determine the addressing of the SIM for RD transfers. The entire sequence of transfer operations relative to SIM's is depicted in the following charts. X(n) and U(n) in these charts represent SIM address pointers; Y(m), V(m) represent the type of information (telephone, data, etc.).

CHART I
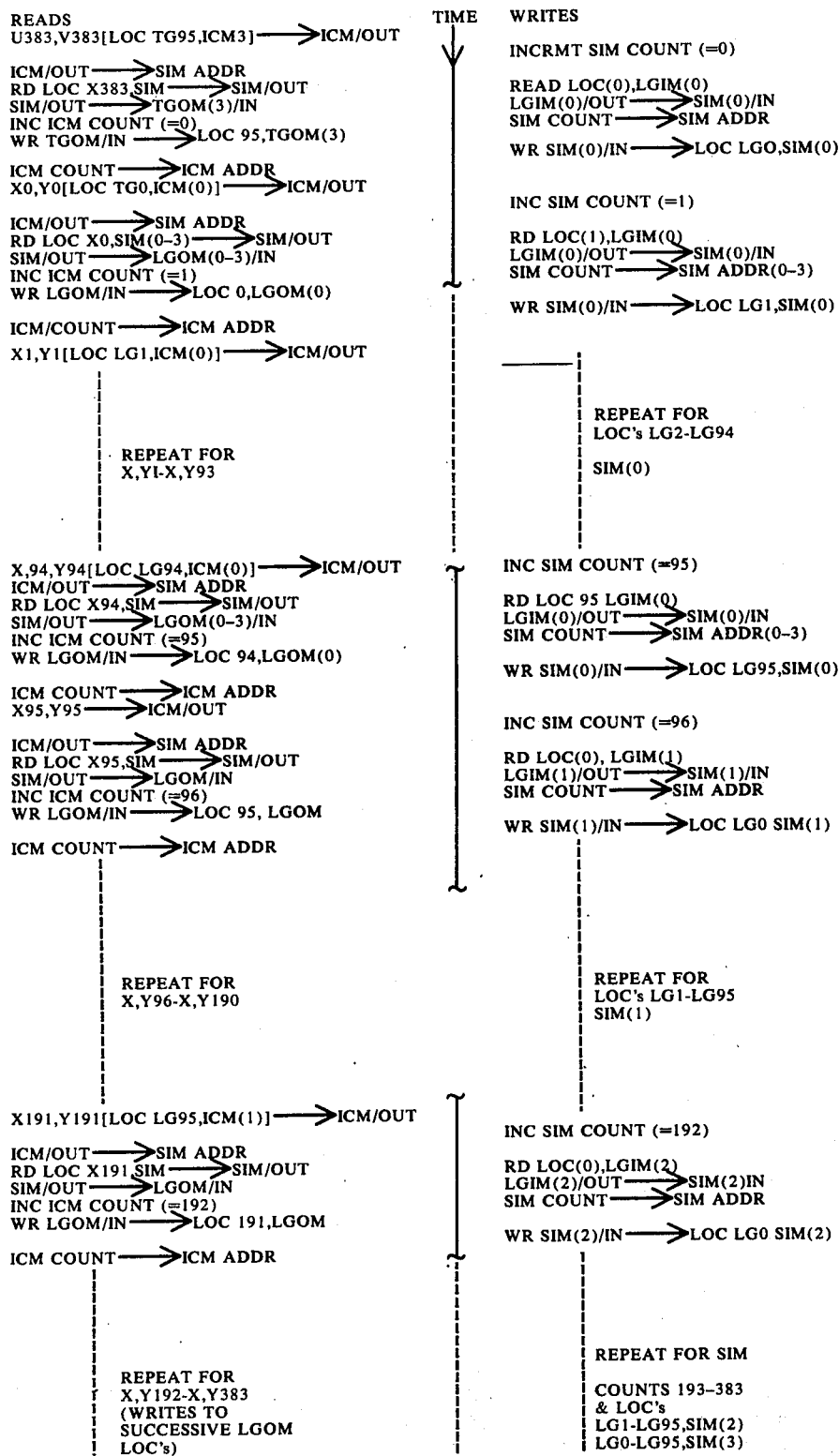

CHART II

| READS | TIME | WRITES |
|---|---|---|
| | | SIM R/W EVEN CYCLE (125 μSEC, R/W OFFSET 162 n SEC) |
| | | INC SIM CT (=0) |
| | | RD LOC(0), TGIM(O) |
| | ↓ | LGIM(0) ──▶SIM(0)/IN |
| INC ICM CT | | SIM CT ──▶SIM ADDR |
| (LAST OP ODD CYCLE | | WR SIM(0)/IN ──▶LOC TG0 SIM(0) |
| ICM COUNT ──▶ICM ADDR | | |
| U0,V0 LOC TG0,ICM(0)] ──▶ICM/OUT | | |
| | | INC SIM CT (=1) |
| ICM/OUT ──▶SIM ADDR | | |
| RD LOC U0 "ANY"SIM ──▶SIM/OUT | | RD LOC(1),TGIM(0) |
| SIM/OUT ──▶TGOM(0)/IN | | |
| INC ICM CT (=1) | | |
| WR TGOM/IN ──▶LOC 0,TGOM(0) | | REPEAT FOR |
| | | LOC'S TG1-TG95 SIM(0) |
| | | TG0-TG95 SIM(1) |
| REPEAT FOR | | TG1-TG95 SIM(2) |
| (U,V)1-(U,V)383 | | TG0-TG95 SIM(3) |
| WRITES TO TGOM(0,1,2,3) | | |
| SUCCESSIVELY | | |

2.4 TGIM

The TGIM (FIG. 8) is used to hold incoming phase corrected frames while they are demultiplexed and switched through the SIM. Since frames are continually received every six ms, it is necessary to organize the TGIM as a double buffer or A/B buffer. Each side of the TGIM holds a six ms frame or 1152 bytes. As one side of the TGIM is loaded from the trunk, the other side (loaded in the previous frame) is unloaded to the SIM.

The TGIM contains 48 × 24 byte locations; i.e. 24 bytes per RC. Corresponding bytes of all RC's are grouped (or addressable) for co-transfer to the SIM in a channel time.

2.4.1 Trunk to TGIM

The TGIM (A or B) is loaded byte serially from the trunk (via a bit-to-byte Phase Adjustment Buffer) under control of a pair of counters which define the TGIM destination locations of successive bytes. As bytes are received from the Phase Buffer, they are stored in consecutive byte groups. The position that each byte occupies in the byte group is determined by and corresponds to the rear channel in which the byte is carried.

2.4.2 TGIM to SIM

The demultiplexing process involves the mapping of the incoming real channels to the 96 VC's in supported by the trunk. The received VAC mask stripped of redundancy is held in a VAC buffer (not shown) and utilized together with three TGIM-to-SIM address counters to control the mapping. Two of the three counters define the locations of successive bytes in TGIM (in RC positonal correspondence) and the other counter addresses successive bits of the buffered VAC mask received from the trunk.

TGIM to SIM transfers occur during even channel times of the frame structure. At the beginning of a frame (channel O), counters are reset. At the 1.296 μs rate, the VAC bit counter is incremented to sequentially read the 96-bit VAC mash from the VAC buffer. The source address count is incremented only if the VAC bit read from the buffer is "1". If the bit read from the VAC buffer is 1, the corresponding byte pointed to by the source address count is fetched from the TGIM to the VC location in the TG section of SIM corresponding to the VAC bit count. If the VAC bit is "0", a byte of "idle noise" is used to "fill" the corresponding inactive VC in location in SIM. At the end of channel (0) all 96 TG locations of SIM (VC's in) have been supplied a byte of data from each RC and from the idle noise source. No more than 47 of the VC's in may receive data from the TGIM since no more than 47 VC's may be active during a frame. During the next even channel, the entire process is repeated on the second byte of each RC group. Since there are 24 even channel times in a frame, 24 bytes (or one full channel of data) are demultiplexed to each TG (VC in) location of SIM, for each of the 96 VC's in, over a frame.

The TGIM contains 48 real channels from the frame, i.e. including channel 1 which contains the VAC mask. The VAC mask need not be demultiplexed to the SIM (if trunk-to-trunk transfers are not utilized). The controls may then be designed to have the source counter "jump" around the VAC mask from RC 0 to RC 2 locations of TGIM.

2.4.3 VAC Mask Loading

The VAC mask received on the trunk in line IT resides in the VAC Buffer until channel 47 time, i.e. 45 channel times or 5,625 ms. During channel 47 the mask and its associated FEC are set to the FEC hardware. FEC hardware decodes the mask, corrects any detected errors and sends the results to the TGIM-SIM VAC buffer. The TGIM-SIM controls are normally idle during odd channel times but channel 47 is an exception. The process completes before the end of channel 47 in time for channel O. Channel O is the first time that the corrected mask is used for the TGIM-SIM transfers.

2.5 TGOM

The TGOM (FIG. 7) buffers the 96 VC's out in preparation for their transmission on the trunk out interface. Like the TGIM, the TGOM is an A/B buffer since BC's out are continually loaded and unloaded. However, the TGOM is twice as large as The TGIM since it must buffer 96 VC's as opposed to 48 RC's. The TG0M contains 24 group locations, each containing 96 byte locations; with one byte position reserved for each of the VC's out. The corresponding bytes in successive groups are associated with the 24 bytes which comprise a channel.

One side of the TGOM is loaded from the SIM at successive addresses of a group while selected positions of the other side are unloaded onto the Trunk Out, channel by channel. Six ms are required to completely fill one side of the TGOM from the 96 VC's out of SIM with 24 bytes collected from each VC. Every 6 ms the loading alternates to the other side. As one side is loaded, the other side is activity compressed and unloaded onto the trunk. That is, a subset of the 96 VC's are chosen to be transmitted in the 48 channel frame.

2.5.1 SIM to TGOM

The TGOM is loaded from the SIM under control of a pair of address counters which define destination locations in TGOM of the tranferred bytes.

SIM to TGOM transfers occur in odd channel times of the frame structure generated in the respective station tier. During each odd channel time, a corresponding byte group in TGOM is loaded with 96 bytes from 96 VC's of SIM. At the beginning of channel 1, counters are reset to point to byte group 0. Each byte received by the Input register of TGOM is written into the addressed TGOM location. The process described above is repeated and occurs 24 times within a frame. Upon completion a 6 ms A/B window causes the loading to switch to the alternate side of the TGOM and repeats as described.

2.5.2 TGOM to Trunk

TGOM to trunk logic is used to select and outgate onto the trunk a subset of the 96 VC's contained in the TGOM. These channels are compressed into 47 available real channels according to a VAC selection algorithm. Data is read from the TGOM in a different order than that in which it is stored. If a VC is chosen for transmission, all 24 bytes associated with it are transmitted contiguously in a real channel.

Two counters are used in conjunction for address generation. One of these address bits in an "old mask" VAC buffer contains the VAC mask generated by the freezeout logic and controls the other counter and the outgating of the VC's. The procedure for incrementing the counters is as follows.

During a channel time (125 $\mu$s) the VAC bit counter is incremented and the corresponding VAC bit is read from the "old mask buffer". If the bit is 0, which indicates the respective VC is inactive, the counter is incremented to the next position until a 1 bit is found. If the bit is 1, the counter is stopped. At the beginning of the next channel time, the address count is conditioned by the VAC count to point to the VC to be passed to the trunk out from TGOM. During the 125 $\mu$s channel time, the address count is incremented to address the 24 bytes which made up the channel while the VAC counter is advanced to search for the next VC to be sent out in the next real channel.

2.5.3 VAC Sampling

As discussed before, 24 × 96 SIM to TGOM byte transfers occur during odd channel times of the frame structure. During the last scan of all 96 VC's to the TGOM, i.e. channel 47 time, for each VC the VAC bit contained in the SIM and the corresponding data/voice bit contained in the ICM is stored bit by bit into a "new VAC" buffer. At the same time these bits are examined by VAC freezeout logic together with previous mask bits from the "old VAC" buffer for calculation of a new VAC mask. The buffers, as well as the VAC counter are not required for output control during channel 47 time since channel 47 is the last channel of the frame.

Figure 15:
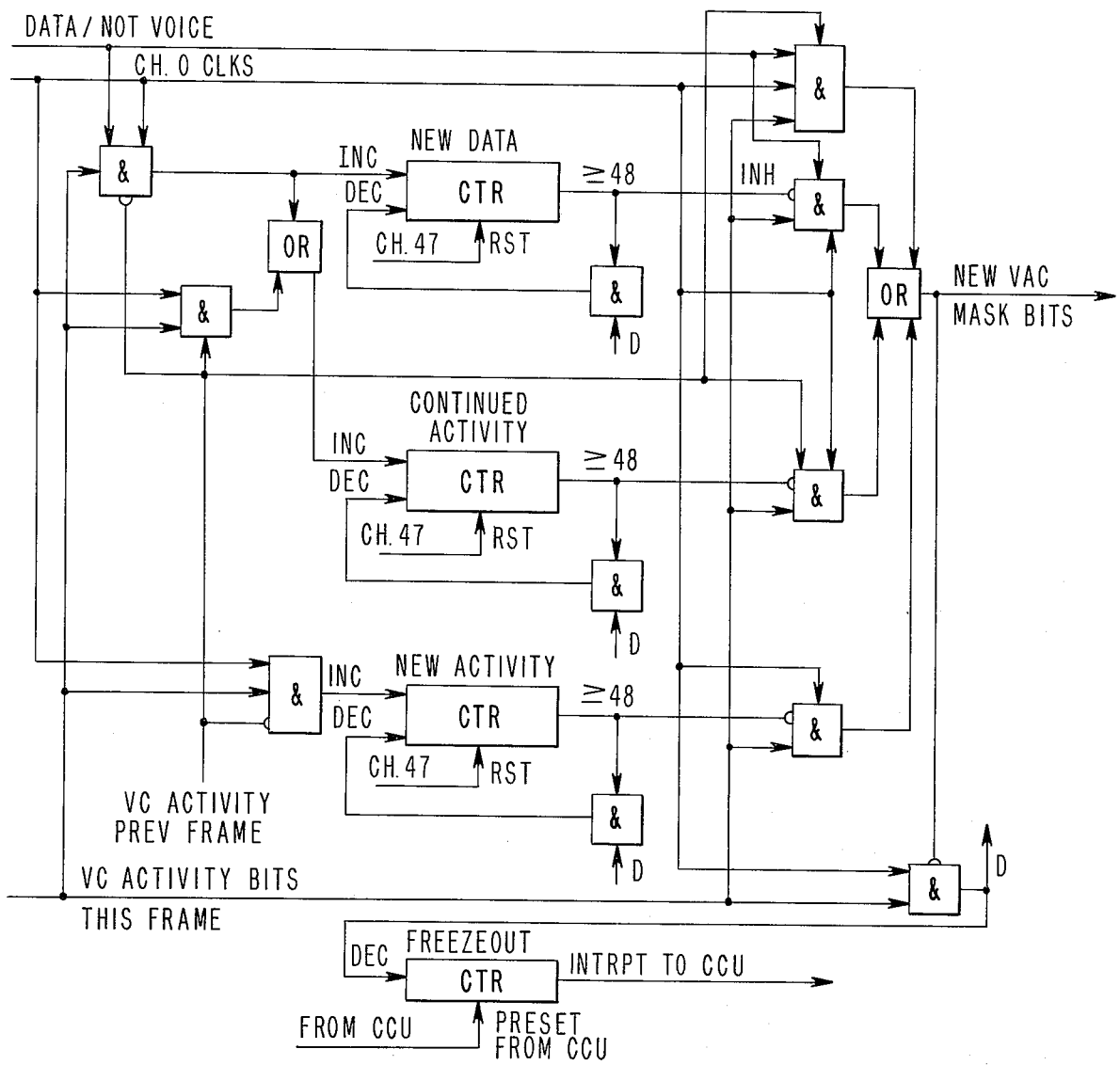
FIG. 15 shows the subject freezeout logic and associated management reporting (interrupt) facilities.

2.5.4 New Mask Generation (FIG. 15)

At the end of channel 47 time, freezeout counters are incremented and the new VAC can be formulated. During channel O time, VC O (control information) is always transmitted in real channel O and therefore the VAC counter is not required for location. During channel O, the VAC counter is used to address the new and old VAC buffers. The data/voice bit, the new VAC bit sampled during channel 47 time, and the old VAC bit from the previous mask are all sent to the freezeout hardware one VC at a time. A new mask bit for that VC is immediately returned by the freezeout hardware and written into the old mask VAC buffer. Approximately one half of real channel 0 is required to completely fill the old VAC buffer with the new mask.

During channel O, the new VAC mask and its associated FEC are formulated and stored in a Trunk In/Trunk Out VAC Buffer. During channel 1 the new mask with FEC is passed to trunk out while the new mask in the old VAC must buffer is being scanned by the VAC counter to locate the first service VC to be transmitted in real channel 2. The last time in which the VAC counter is used for VAC-bit searching is channel 46 and in channel 47, the VAC counter is again available for use in new mask formulation for the next frame.

2.6 VAC Freezeout Hardware

Voice Activity Compression is used to compress 96 VC's into 47 real channels on the trunk line. Connections established for voice are usually less than 50% active. Activity compression is a dynamic process recurring every 6 ms on each connection. Normally, less than half the connections will be active each time a sample is made and all will be assigned real channels. However, sometimes more than 47 connections are concurrently active during a VAC sample and a decision must be made to freezeout VC's.

The priority scheme used to create the new VAC mask is given below with highest priority listed first.

a. Data port active in the previous 6 ms frame.
b. Data port not active in the previous 6 ms frame.
c. Voice port active in the previous 6 ms frame.
d. Voice port not active in the previous 6 ms frame.

If "ties" cannot be broken according to the above priority algorithm, then the low order VC's within the lowest remaining priority category are frozen out first; beginning with VC 1. VC 0 (the control information) is an exception and is never frozen out.

Three counters are used to implement the VAC freezeout algorithm and are described below. A diagram of the counters is shown in FIG. 15. The counts are used to decide which VC's to freeze out and are incremented during real channel 47 time.

2.6.1 New Data Counter

This counter is incremented when the VC is a data channel not active in the previous 6 ms frame.

2.6.2 Continued Activity

This counter is incremented when the VC is a data channel not active in the previous 6 ms frame and is active again in this frame.

2.6.3 New Activity Counter

This counter is incremented when the VC was not active in the previous 6 ms frame and is active in this frame.

During real channel 0 time, the new VAC mask is formed for that 6 ms frame. A VAC mask bit for a VC will be made active for the following cases:
 a. Voice activity bit active and new activity count is less than 48 OR
 b. Voice activity bit active, VC is data channel and new data count is less than 48 OR
 c. Voice activity bit active, VAC bit active in previous 6 ms frame and continued activity count less than 48 OR
 d. Voice activity bit active, VAC bit active during previous 6 ms frame and VC is data channel.

As any activity bit is frozen out (reset to 0) because the count is greater than 47, the count is decremented by 1 until the count is 47.

2.6.4 Program Freezeout Interface

The system manager has a requirement to know the number of VC's frozen out in the 6 ms frame. The CCU furnishes an 8-bit "threshold" count which is decremented by the number of channels frozen out. When the latter number exceeds this count, a level 3 interrupt is generated to notify the CCU. The same count is used until changed by the CCU. Each time the count is exceeded a level 3 is generated.

2.7 Switching and Program Control

The Slot Interchange Memory (SIM) and the Interconnect Memory (ICM) are used in conjunction with one another and provide a program controllable switch capability.

2.7.1. SIM (see FIG. 5)

The SIM is loaded by the LGIM and TGIM and is the point from which all programmed switching occurs i.e. Port to Trunk, Trunk to Port, Port to Port, and Trunk to Trunk. The memory is 12 bits wide and 192 locations deep and may be logically divided into two halves 96 locations each. One half contains a unique LG location for each input port and is loaded byte serial from the LGIM in a sequential manner. During odd channel times, a counter is used to address the memory at a rate of one location every 324 nano-seconds. At this rate a byte from each of 96 ports in is written into the 96 SIM locations in a 31.25 micro-second time period.

The other half of the SIM memory contains a unique TG location for each Virtual Channel in (VC in) and is loaded byte serially from the TGIM. During even channels, the SIM counter addresses the memory at a rate of one location every 1,296 micro-seconds. At this rate all 96 VC's in are written into the respective 96 SIM locations in a 125 micro-second time period. Active VC's receive data from the TGIM while inactive channels receive idle noise.

The output of the SIM may be directed to either the TGOM or the LGOM. The SIM read operation is controlled by the Interconnect Memory (ICM) which is programmable and loaded via the 3705/NCU interface.

During odd channel times, the ICM is used to address the SIM in order to accomplish Port to Trunk or Trunk to Trunk switching. The SIM data is read out byte serially to the TGOM at the rate of one location every 1,296 microseconds. At this rate all 96 locations are loaded into the TGOM in 125 micro-seconds.

During even channel times, the ICM is used to address the SIM in order to accomplish Trunk to Port or Port to Port switching, The SIM data is read out byte serially to the LGOM at the rate of one location every 324 nano-seconds. At this rate all 96 locations are loaded into the LGOM in 31.25 micro-seconds.

2.7.1.1 SIM Facilities

2.7.1.1.1 SIM Data-In Register

The SIM In register is used to contain data which is to be written into the SIM.

The SIM In register is 10 bits plus 2 parity (2P) bits wide. The inputs originate from the TGIM and LGIM and each enters the register on an independent bus. An input bus from the CCU provides a manual load capability.

2.7.1.1.2 SIM Counter

The SIM counter is used to generate SIM addresses for LGIM to SIM and TGIM to SIM write transfers.

The counter ranges over all addressable SIM locations.

2.7.1.1.3 SIM-CCU Address Register

The CCU address register (not shown) is used to address the SIM from the CCU console or a diagnostic program.

The CCU Address register is 8 bits wide and can only be used when the machine is in the stop state.

2.7.1.1.4 SIM Address Register

The SIM Address register is used to address locations in the SIM for read and write operations.

The address register is 10 bits wide and is loaded via the SIM counter for writes and the ICM for reads. Since read operations can address up to 4 interconnected SIM's, up to 768 locations can be addressed.

2.7.1.1.5 SIM Memory

The SIM memory is used to store data from the Ports In (LGIM) and Virtual Channels In (TGIM) until they can be switched out to the TGOM and LGOM, respectively.

The SIM memory is 10 bits plus 2 parity bits wide and is logically divided into 2 parts, each 96 locations deep.

2.7.1.1.6 SIM Output Register

The SIM Output register is used to hold data which is read from the SIM memory. The register output is used to drive the SIM bus which is "OR" dotted between interconnected SIM tiers.

The SIM Out register is ten bits plus two parity bits wide.

2.7.1.1.7 SIM Dot Output Powering

SIM Dot Output Powering is accomplished using Transmission Line Drivers. Powering is essential to minimize the delay on a large board dot which is the case when multiple SIM's are interconnected.

2.7.1.1.8 SIM Output Gate

The function of the SIM Output Gate is to allow interconnected switch tiers to run independent of one another. If the tier is In System, the board dot input to the gate is selected. If the tier is Out of System, only its own SIM output is selected by the gate. A parity check is performed on the output of the SIM gate.

2.7.1.1.9 SIM Contents

Each SIM location is 12 bits wide.
- Bit 0: This is a VAC bit which indicates whether or not a particular port or virtual channel is active.
- Bit 1: This bit is reserved.
- Bit P0: This bit is parity on bits 0 and 1.
- Bits 8 through 15: These bits contain one byte of voice or data from the ports in and VC's in.
- Bit P1: This bit is parity on bits 8–15.

2.7.2 ICM (See FIG. 5)

The ICM is a programmable element of the digital switch that provides address information to the SIM to accomplish SIM to Trunk and SIM to Port transfers.

The ICM may be dynamically accessed by the CCU in order to manage the switching function. Both read and write operations are possible when the system is running or stopped. When the system is running, sufficient time slots are available in the ICM (between ICM reads) to accommodate the maximum access rate from the CCU.

The ICM array module is two bytes wide and 192 locations deep and may be logically divided into two halves, 96 locations each. One half contains a unique location for each output port. The ICM locations correspond directly with the locations in the respective LGOM. During even channel times, a counter is used to address these 96 locations in the ICM at the rate of one location every 324 nano-seconds. At this rate all 96 locations are read out of each ICM module in a 125 micro-second period.

The other half of the ICM memory contains a unique location for each Virtual Channel out (VC out). These locations correspond directly with the locations in the TGOM. During odd channel times, the counter addresses the ICM at a rate of one location every 1.296 micro-seconds. At this rate all 96 locations are read from each ICM in a 125 micro-second period.

2.7.2.1 ICM Facilities

2.7.2.1.1 ICM Input Register

The function of the ICM Input register is to hold asynchronous CCU data until it can be clocked into the ICM memory.

The ICM Input register is sixteen bits plus two parity bits wide. Bits 5, 6 and 7 are spare.

2.7.2.1.2 ICM Counter

The ICM counter provides addresses to the ICM memory during read operations.

2.7.2.1.3 ICM - CCU Address Register

The function of the ICM-CCU Address register is to hold the asynchronous address from the CCU until it can be clocked into the ICM Address register.

The ICM-CCU Address register is 8 bits wide.

2.7.2.1.4 ICM Address Register

The ICM Address register provides addresses to the ICM memory for read and write operations. During read operations, the address register is loaded via the ICM counter and for writes it is loaded via the CCU Address register.

The ICM Address register is ten bits wide with the first 2 bits used for control.

2.7.2.1.5 ICM Memory

The ICM Memory is 2 bytes plus 2 parity bits wide and is logically divided into 2 parts, each 96 locations deep. The first 2 bits of the first byte and all bits of the second byte are read from the ICM memory and are used to address the SIM. Bits 2, 3 and 4 of the first byte are control bits which are sent to the LGOM. These ICM control bits indicate the modes of operation of respective ports in and VC's in. The remaining three bits are spare and are reserved.

2.7.2.1.6 ICM Output Register

The ICM Output register is used to hold data which is read from the ICM memory. The register output is used to drive the ICM bus which is OR dotted between interconnected ICM's.

The ICM Output register is sixteen bits plus two parity bits wide. Three of the bits are spare as in the ICM memory.

2.7.2.1.7 ICM Dot Output Powering

ICM Dot Output Powering is accomplished using Transmission Line Drivers. As in the SIM, the ICM output can be dotted with other ICM's.

2.7.2.1.8 ICM Output Gate

The function of the ICM Output Gate is to allow switch tiers to run independent of one another when they are interconnected. If the tier is In System, the board dot input to the gate is selected. If the tier is Out of System, only its own ICM output is selected by the gate. A parity check is performed on the output of the ICM gate.

2.7.2.1.9 ICM

An ICM location is 18 bits wide and contains address information for the SIM and control bits for the LGOM.
- Bits 0 and 1: These bits are a tier ID and select the SIM.
- Bits 2 through 4: These bits are used for control and are sent to the LGOM. They indicate to the port how it is to be used, i.e. voice or data.
- Bits 5 through 7: These bits are reserved.
- Bit Pϕ: This is the parity bit on the first byte.
- Bits 8 through 15: These bits are address bits for the SIM.
- Bit P1: This is the parity bit on the second byte.

2.8 SIM-ICM Interconnection

Two to 4 tiers may be interconnected together to increase the switch capacity. This is accomplished by OR dotting the ICM and SIM output buses of each tier to form a common ICM and SIM.

When four tiers are interconnected, 384 SIM reads and 384 writes must be executed every 125 us. Enough bandwidth is available in the SIM to sustain this rate which equates to a read and write every 324 ns.

2.9 SIM-ICM Timing

FIG. 11 depicts the SIM and ICM timing. SIM reads and writes are always interleaved with each other. In the maximum switch configuration SIM reads occur every 324 ns. interrleaved with the reads are writes which likewise occur every 324 ns and are offset from the reads by 162 ns.

During odd channel times, LGIM to SIM burst transfers take place for each SIM. The SIM counter is used for address generation and increments every 324 nanoseconds until 96 SIM locations have been written into from LGIM. The total time required is 31.25 us and each SIM has its own 31.25 us quadrant in which the operation occurs. During this same odd channel time, SIM to TGOM transfers occur which are "arbitrarily" sequenced over the address space of the four SIM's. The ICM addresses the SIM for reads at 1.296 us rate within each SIM. At this rate 96 locations are read from the SIM and transferred to the TGOM in 125 us. With four SIM's configured together, the SIM receives addresses at 4 times the rate of one read every 324 ns. During even channel times, SIM to LGOM transfers take place for each SIM. The ICM provides addresses to the SIM for read operations at a 324 ns rate. After 31.25 μs, 96 SIM locations have been read and transferred to the LGOM for one SIM. The four SIM's have their own dedicated quadrants in which the operation takes place. During the same 125 us channel time, TGIM to SIM write operations occur. For this transfer, the SIM counter is used for address generation and increments at a 1.296 μs rate in each required At this rate, 125 μs are requied to update 96 SIM locations from the TGIM for each SIM. Since the writes are variously interleaved between the four tiers, the overall rate to the SIM is one write every 324 ns.

2.10 Configuration

Figure 14:
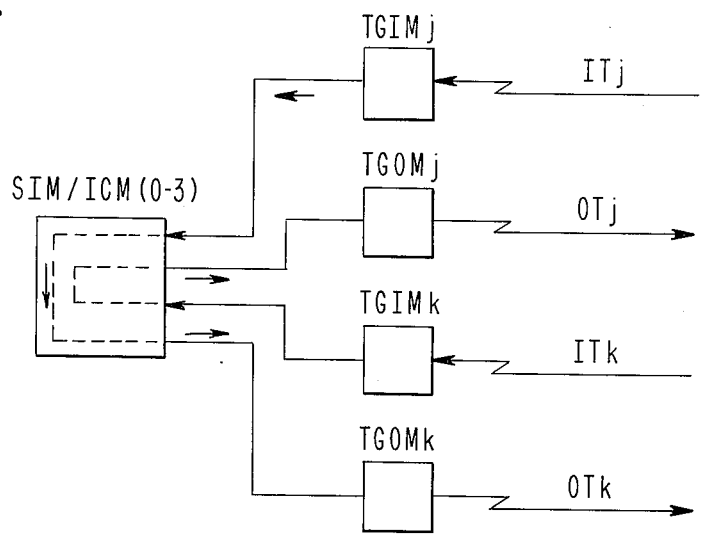

Connection configurations which can be established in the SIM/ICM switch are shown schematically in FIGS. 12-14. Activity bit transfers are always required for TGIM to LGOM circuit connections and for TGOM to TGOM connections. Activity bits need not be transferred with TGIM to LGOM or LGIM to LGOM traffic.

2.11 Activity Detection/Echo Control

FIG. 6 shows the organization for line port in activity detection and echo control. Send and Receive traffic samples in each duplex telephone circuit connection are examined in pairs by the VAC/Echo logic to distinguish real activity from noise and echo. Real activity is assigned activity bit value 1. Other activity and noise are assigned 0 bits. The delta mod values of a byte constituting 8 Port in samples are passed to LGIM together with a single activity bit whose value is 1 if any traffic bit sample of the byte represents real activity. Whenever there is line port in activity the demodulation gain is reduced for that sample cycle (by decrementing of compand integration in step size).

Line port in activity bits per byte are passed via LGIM and SIM to TGOM (for LGIM to TGOM circuit connections) and utilized to set up "new" activity bits, one per 24 byte VC. If a 1 activity bit is received with any VC byte the activity bit for the entire 24 byte VC group is set to 1. As explained previously these channel activity bits are processed by the freezeout logic to formulate the VAC mask for trunk out channel allotment and TCI transmission.

Since echo is assigned 0 activity a VC out of 24 echo bytes is not allocated an RC on the trunk, effectively canceling the echo.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Common control digital switch apparatus for variably handling signals in digital form between locally accessible line multiples and time slot channels of locally accessible time divided digital trunk links comprising:
   slot interchange storage switching means having time interchangeable randomly accessible line slot and trunk slot buffer storage spaces of different capacity, said spaces being subject to variably paired interchange association;
   first means for passing information representational signals between said line slot spaces and selectively associated lines in respective said line multiples;
   second means for passing information representational signals between said trunk slot spaces and selectively associated real time slot channels on said trunk links; and
   common control means linked to said first and second means and said interchange storage means for variably establishing paired interchange associations of line slot and trunk slot spaces in random order, thereby effectively providing for remote signaling communication relative to said lines via randomly associated channels of said trunk links.

2. Apparatus according to claim 1 characterized in that said interchange storage switching means comprises an arbitrary number of from 1 to k identically structured discrete interchange modules having individual line slot and trunk slot spaces and common (dot-OR'd) addressing and input/output interchange circuits; and being adaptive to be operated cyclically in unison at an interchange rate such that the aggregate addressing capacity of k said modules can be scanned in each interchange cycle of operation and in sequence such that said line slots may be assigned arbitrary connection associations to said trunk slots in random order over the aggregate addressing range of k said modules.

3. Apparatus according to claim 2 characterized in that the interchange cycling of the slot interchange storage switch means is conducted at a rate, and in a sequence, suitable for effecting interchange associations between randomly paired lines and between randomly paired trunk slots and lines.

4. Apparatus according to claim 3 wherein said first means includes means for monitoring transmissive activity of selectively associated lines and said first, second and switching means include means for passing line activity indicating information for storage relative to associated said trunk slot spaces; said indicating information being useful for TASI allocation of groups of said trunk channels for carrying signals relative to larger sized groups of said lines in randomly ordered pair associations spanning the aggregate addressing range of k said modules.

5. Apparatus according to claim 2 wherein said first means includes means for monitoring transmissive activity of said selectively associated lines and said switching and first and second means include means for passing line activity indicating information useful for TASI allocation of groups of said trunk channels for carrying information representational signals relative to larger sized groups of said lines in random pair associations spanning the aggregate addressing range of k said modules.

6. Apparatus according to claim 1 wherein: said first means includes means for retentively indicating activity states of information occupying said line slot spaces; said second means includes means for retentively indicating activity states of information occupying said trunk slot spaces; said switching means includes means for interchangeably switching said activity indications; and said apparatus includes means for effectuating TASI allocation of groups of real time slots on said trunk links relative to respectively associated larger sized groups of said lines.

7. Apparatus according to claim 6 including means adaptive to detect potential overloading of a said group of trunk channels and to balance the load on said group by freezing out signals passed from selected lines, in a selective order of priority based upon classes of service pre-associated with said lines and continuity of activity on said lines.

8. In a channel allotment and (VAC) mask formulation system for voice telephone and data transmission using TASI with selective blocking (freezeout) of overloads — in which multiple real channels recurrent in frames are allotted to a larger number of virtual telephone and data channels contending for said allotments and a mask indicating the allotment of a frame is required to be formulated in a time much shorter than the frame — multi-priority freezeout logic for eliminating excess contending virtual channels comprising:
 means operative over an interval much shorter than a frame, relative to said virtual channels, for concurrently distinguishing the number of virtual channels containing: a) new data activity; b) either new data activity or continued activity (data or telephone voice); and c) new activity (data or telephone voice); and
 means coactive with said distinguishing means for formulating a channel allotment mask containing ordered binary values representing allotment and non-allotment control factors for allotment of said real channels to said virtual channels containing activity; said mask invariably containing less than or equal to a predetermined number of said allotment control factors, said number related to the number of real channels in a frame; and
 means utilizing said distinguishing means to resolve contention overload due to there being more active virtual channels then allotable real channels; said contention resolution effectively granting transmission precedence to data over telephone voice and to continuing activity over new activity.

9. Freezeout logic according to claim 8 in which said means for distinguishing comprises plural counters having "overflow" connections for negatively influencing said formulating means to formulate non-allotment factors for virtual channels containing activity.

10. A time division switch module linked to multiple communication channels; said module having multiple switching sites useful for transposing signals representing voice telephone information traffic and traffic information other than voice telephone information (e.g. data) variously between said communication channels; said module including means associated with individual said sites for transposing control information signals in transpositional association with traffic signals passed through respective sites; and means for utilizing said transposed control signals to assign specific said communication channels selectively in a TASI mode to receive traffic signals transpositioned through a group of sites associated with said specific channels.

11. A switch module in accordance with claim 10 wherein said control information is in a form susceptible of distinguishing the audible activity context of transposed voice telephone traffic signals (e.g. relative to noise and echo).

12. A switch module in accordance with claim 11 wherein said control information is in a form susceptible of distinguishing associated said sites as connected "in service" and disconnected "out of service", of distinguishing traffic in transit through connected sites as voice telephone information and information other than voice telephone information and of distinguishing voice telephone traffic as having active and inactive "pause or echo" contexts of audible intelligibility.

13. A switch module in accordance with claim 10 in combination with means for receiving remotely originated traffic information signals, via communication channels assigned remotely in a TASI mode, in association with assignment information distinguishing sources of said received traffic signals; and means for utilizing said associated assignment information to steer said received traffic to sites of said module preassociated with respective transposition destinations of said received traffic signals.

14. A switch module in accordance with claim 10 in combination with block storing means for storing byte samples of information transposed byte sequentially through individual said sites in order to accumulate samples relative to each site into a multibyte block suitable for conveyance in time concentrated form through a block-capacity time-division communication channel; and means for using control information transposed with said bytes for determining conditions under which a said block-capacity channel in a time division frame of multiple block-capacity channels is assignable in said TASI mode to carry out said conveyance.

15. The combination of claim 14 wherein:
 the module is operated cyclically in time coordination with the multiplex frame repetition rhythm of said block-capacity channels and assignments of said block-capacity channels are established while the last sample of each block is being passed from the switch to the block storing means, in time for allowing the stored blocks to be transmitted in the next multiplex frame of said communication channels.

* * * * *